(12) United States Patent
Maruyama et al.

(10) Patent No.: US 7,200,725 B2
(45) Date of Patent: Apr. 3, 2007

(54) STORAGE REMOTE COPY SYSTEM

(75) Inventors: Tetsuya Maruyama, Yokohama (JP); Takashige Iwamura, Yokohama (JP); Hiroshi Arakawa, Sagamihara (JP); Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 144 days.

(21) Appl. No.: 10/950,577

(22) Filed: Sep. 28, 2004

(65) Prior Publication Data
US 2006/0031646 A1    Feb. 9, 2006

(30) Foreign Application Priority Data
Aug. 9, 2004   (JP)   ............................. 2004-231789
Sep. 17, 2004  (JP)   ............................. 2004-270672

(51) Int. Cl.
*G06F 12/00* (2006.01)

(52) U.S. Cl. .................... 711/161; 711/162; 711/167

(58) Field of Classification Search .................... None
See application file for complete search history.

(56) References Cited

U.S. PATENT DOCUMENTS

| 5,799,323 | A | 8/1998 | Mosher, Jr. et al. | |
| 6,301,643 | B1 * | 10/2001 | Crockett et al. | ............ 711/162 |
| 6,789,178 | B2 | 9/2004 | Mikkelsen et al. | |
| 2004/0064659 | A1 | 4/2004 | Achiwa et al. | |
| 2004/0260873 | A1 | 12/2004 | Watanabe | |
| 2005/0198455 | A1 | 9/2005 | Yagawa et al. | |

FOREIGN PATENT DOCUMENTS

| EP | 1150210 | 10/2001 |
| JP | 7-72981 | 3/1995 |
| JP | 2002-149499 | 5/2002 |

OTHER PUBLICATIONS

C. Mikkelsen, "The Hitachi NanoCopy™ Advantage—An Industry First for Point-in-Time and Real-Time Copy".

* cited by examiner

*Primary Examiner*—Reginald Bragdon
*Assistant Examiner*—Thanh D Vo
(74) *Attorney, Agent, or Firm*—Antonelli, Terry, Stout and Kraus, LLP.

(57) ABSTRACT

In the conventional storage system, consistency is ensured only for writing from a single storage. Asynchronous remote copying and local replication are also alternately suspended in the conventional system, so that the suspension time increases and the volume in which consistency is obtained becomes old. Two local replicas are prepared, for a volume containing stored data that is transferred from the main site by asynchronous remote copying, in the storage at the sub-site. Each pair of local replicas is alternately suspended by a time-specific suspension command according to the time of the timestamp attached to the write data, and replica data in which the time sequence is secured is continually prepared. When a failure occurs at the main site, the data is recovered using the replica data.

12 Claims, 19 Drawing Sheets

FIG.4

PAIR INFORMATION (211)

| SOURCE LU ID (401) | TARGET LU ID (402) | PAIR STATE (403) | DIFFERENTIAL BMP (404) |
|---|---|---|---|
| 1 | 2 | PAIR | |
| 3 | 4 | | |
| 5 | 6 | | |
| 7 | 8 | | |

FIG.5

RC DATA INFORMATION (212)

| LUID (501) | SEQ# (502) | TIME STAMP (503) | WRITE DATA (504) | Flag (505) |
|---|---|---|---|---|
| 1 | 1 | 9:59 | ············ | 0 |
| 5 | 2 | 10:00 | ············ | 1 |
| 11 | 3 | 10:01 | ············ | 0 |

STORAGE REMOTE COPY SYSTEM

CROSS-REFERENCES TO RELATED APPLICATIONS

This application relates to and claims priority from Japanese Patent Application No. 2004-231789, filed on Aug. 9, 2004, the entire disclosure of which is incorporated herein by reference.

BACKGROUND OF THE INVENTION

The present invention relates to an information processing system in which a plurality of storage systems are connected by a network, and it also relates to a technique for data transfer and disaster recovery in an information processing system.

Temporary suspension of business, data loss, and the like can occur in an information processing system that contains a storage system when a failure occurs in the information processing system due to a power failure, a fire, an earthquake, or the like. In order to prevent such situations, the same type of information processing system is placed in a remote location which is not affected by fire, earthquake, or the like, and duplicate information is prepared by transferring the data written in one information processing system (hereinafter referred to as the main site) to the information processing system allocated at the remote location (hereinafter referred to as the sub-site). A technique exists for performing this transfer and duplication of data using a network (hereinafter referred to as remote copying) in order to obtain these effects.

The term "remote copying" refers to the transfer of data stored at a main site from the main site to a sub-site. Backing up of data at a remote location, business continuity, and disaster recovery can thereby be performed.

Remote copying includes two types of methods: synchronous remote copying and asynchronous remote copying. In synchronous remote copying, a storage system at the main site returns, to a computer (hereinafter referred to as a host), a response to a write request from the host after data transfer to the sub-site is completed. There is, therefore, no data loss in synchronous remote copying, and the consistency of the data is ensured. However, as the line delay between sites increases, an I/O delay occurs in the main site between the host and the storage system.

In asynchronous remote copying, the storage system at the main site performs data transfer to the sub-site after returning, to the host, a response to a write request from the host. A decrease in I/O performance between the host and the storage system is thereby less likely to occur even if there is a long distance between sites, but the possibility of data loss occurring increases in comparison to synchronous remote copying, and the sequence of the data is not ensured.

Assurance of data consistency in asynchronous remote copying is described in Japanese Laid-open Patent Application No. 2002-149499. Specifically, a method is disclosed in this publication whereby additional information is attached to the written data from the host, and a sorting of the data is performed at the remote system based on the additional information to ensure consistency.

A technique called NanoCopy is also described in "The Hitachi NanoCopy Advantage", [online], June 1999, Hitachi Data Systems Corporation, Internet <URL: http://www.hds.com/pdf/wp134_nanocopy.pdf> as a method for ensuring the consistency of written data in asynchronous remote copying across a plurality of storage systems. NanoCopy suspends the asynchronous remote copying of a plurality of storage systems at a certain time and creates a replica of the volume at a certain time. By regularly repeating this operation, there continually exists a replica as a volume having consistency at some future time.

A method is also disclosed in Japanese Laid-open Patent Application No. H7-72981 for acquiring a replication of the volume at a certain time at high speed within the same storage. Volume replication by the method disclosed in this publication will be referred to hereinafter as a snapshot.

In the method disclosed in Japanese Laid-open Patent Application No. H7-72981, a volume used for saving data (hereinafter referred to as a volume pool) is secured in advance. The writing performed in the replication source volume subsequent to the replication command is then processed according to the steps described below.

(A) It is confirmed after the replication command whether the writing constitutes the first update for the relevant data area. Step B is executed if the writing is the first, and step C is executed if the writing is not the first.

(B) The contents prior to updating of the data area to be written to are copied to the volume pool, the correspondence information of the replication source area to the area of the volume pool targeted for copying is stored, and step C is executed.

(C) The replication source volume is updated.

When data is read from the replication target after the replication command, processing is performed according to the following steps.

(D) It is confirmed using the correspondence information whether the area, for which there was a read request, has been copied to the volume pool; and, when it has been copied, step E is executed, and step F is executed when it has not been copied.

(E) The data prior to updating is returned from the volume pool using the correspondence information.

(F) The data is returned from the replication source volume. Replication by a snapshot can create replication with a smaller volume capacity than is achieved in volume replication by mirroring.

SUMMARY OF THE INVENTION

In the system of Japanese Laid-open Patent Application No. 2002-149499, consistency is ensured only for writing from a single storage unit. Also, asynchronous remote copying and local replication are alternately suspended in the system of this publication, so that the suspension time increases and the volume in which the consistency is obtained becomes old.

Therefore, an information processing system is disclosed herein whereby asynchronous remote copying that ensures consistency among a plurality of storage devices is performed without suspension of the asynchronous remote copying.

The information processing system has a first site connected to a first computer, and it is provided with a first storage system and a second storage system; and a second site having a third storage system is connected to a second computer and to the first storage system, while a fourth storage system is connected to the second computer and to the second storage system. The third storage system has a first memory area for storing data transferred from the first storage system, and a second memory area and third memory area for storing a copy of the data stored in the first memory area of the third storage system. The fourth storage system has a first memory area for storing data transferred from the first storage system, and a second memory area and third memory area for storing a copy of the data stored in the first memory area of the fourth storage system. The first storage system and the second storage system each receive data with an attached writing time from the first computer. The first storage system transfers, to the third storage system, the data received from the first computer and a copy of the writing time. The second storage system transfers, to the fourth storage system, the data received from the first computer and a copy of the writing time. The third storage system writes, to the first memory area in the third storage system, the data received from the first storage system in the time sequence in which the data was attached. A copy of the data written in the first memory area in the third storage system is written to the second memory area in the third storage system in the time sequence in which the data was attached. The fourth storage system writes, to the first memory area in the fourth storage system, the data received from the second storage system in the time sequence in which the data was attached. A copy of the data written in the first memory area in the fourth storage system is written to the second memory area in the fourth storage system in the time sequence in which the data was attached. When copying is completed to the second memory area in the third storage system regarding the data with an attached writing time that is prior to a first prescribed time specified by the first computer, the third storage system suspends writing, to the second memory area in the third storage system, of a copy of the data written in the first memory area in the third storage system. The third storage system then initiates writing of a copy of the data written in the first memory area in the third storage system to the third memory area in the third storage system. When copying is completed to the second memory area in the fourth storage system regarding the data with an attached writing time that is prior to a first prescribed time specified by the first computer, the fourth storage system suspends writing, to the second memory area in the fourth storage system, of a copy of the data written in the first memory area in the fourth storage system. The fourth storage system then initiates writing of a copy of the data written in the first memory area in the fourth storage system to the third memory area in the fourth storage system.

In an information processing system having a first site and a second site, the consistency of the data stored in a volume at the first site and of the data stored in a volume at the second site at a certain time can be ensured without suspending asynchronous remote copying from the first site to the second site.

BRIEF DESCRIPTION OF THE DRAWINGS

FIG. 4 is a diagram depicting an example of the pair information;

FIG. 5 is a diagram depicting an example of the RC data information;

DESCRIPTION OF THE PREFERRED EMBODIMENTS

Embodiments of the present invention will next be described with reference to the drawings. However, it should be understood that the present invention is not limited by the present embodiments.

First Embodiment

Figure 1:
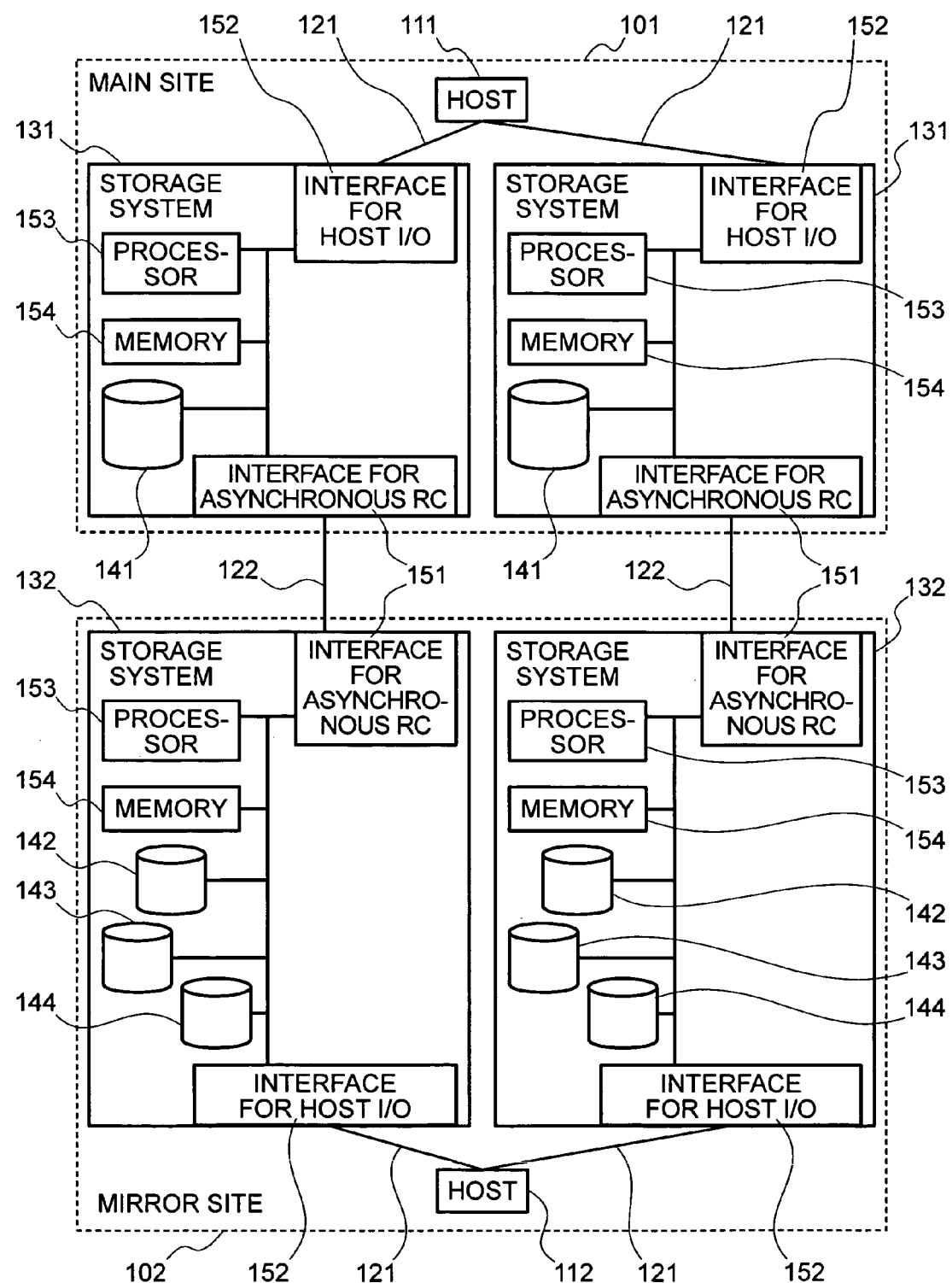
FIG. 1 is a block diagram depicting an example of the information processing system of the first embodiment.

FIG. 1 is a diagram depicting an example of an information processing system in which the present invention is applied.

The information processing system is composed of a main site 101 and a sub-site 102 that are located at a distance from each other. The main site 101 is composed of a host 111, a plurality of storage systems 131, and a network 121 for connecting the host 111 with the plurality of storage systems 131. The sub-site 102 is composed of a host 112, a plurality of storage systems 132, and a network 121 for connecting the host 112 with the plurality of storage systems 132.

The storage systems 131 are each composed of a processor 153; memory 154; a host I/O interface 152 for receiving an I/O request from the host; an asynchronous RC interface 151 connected to the network for performing asynchronous remote copying from the storage systems 131 to the storage systems 132; and a volume 141 for storing data. Data written from the host 111 is stored in the volume 141.

The storage systems 132 have volumes 142, 143, and 144 instead of the volume 141 of the storage systems 131, and their configuration is otherwise the same as that of the storage systems 131. Data transferred from the storage systems 131 by asynchronous remote copying is stored in the volume 142. Data copied at a certain time (hereinafter referred to as a replica) from the data stored in the volume 142 is stored in the volumes 143 and 144. The function whereby this replica is created is referred to hereinafter as the local replication function.

The local replication function is a function for creating a replica of a volume within the same storage system. The volume for storing the replica created by the local replication function is also referred to as the replication volume.

The volumes may also be composed of a plurality of physical disks.

The network 122 is a network for performing data transfer between the storage systems 131 and the storage systems 132. The network 122 is connected to the asynchronous RC interface 151 of the storage systems 131 and storage systems 132.

The host 111 and the host 112 are computers on which an application program operates for performing transaction processing and other service using the volume 141 of the storage systems 131 connected to the host 111 or the volume 142 of the storage systems 132 connected to the host 112. Usually, the host 111 performs service and the host 112 is a standby host for taking over the service when a failure occurs in the main site 101.

When the host 111 and the host 112 write data in a volume, a writing time is attached to the written data using the host internal clock. The time information attached to the written data by the host is called a time stamp.

Figure 16:
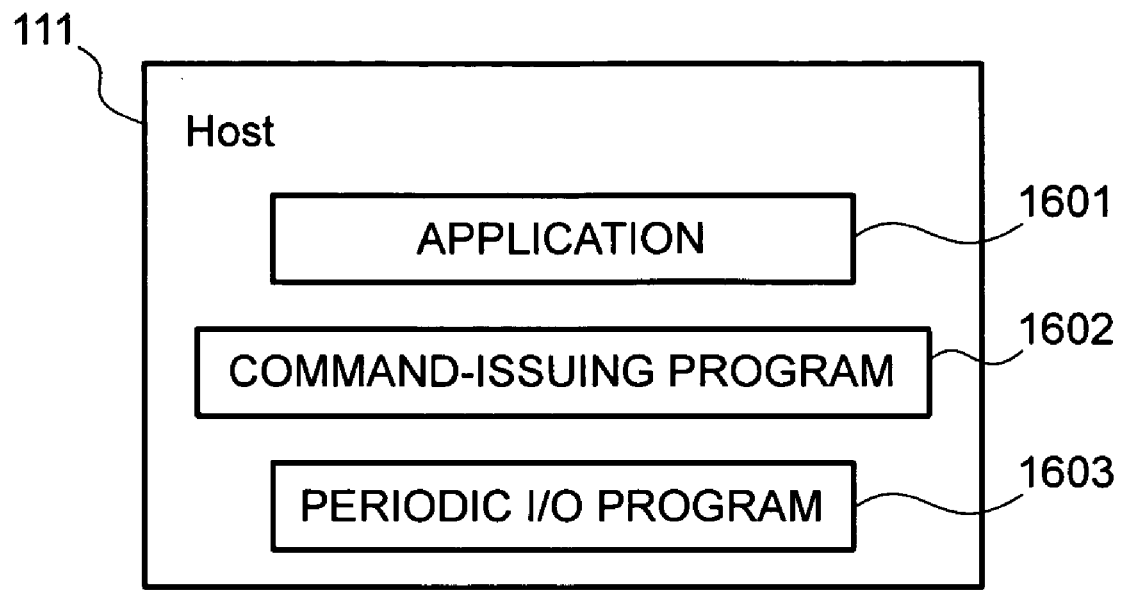
FIG. 16 is a diagram depicting an example of the software configuration of the main site host.

FIG. 16 is a diagram depicting an example of the functional configuration or software configuration of the host 111.

The application 1601 is application software executed in the host 111 by a user, and the application reads the volume of the storage systems 131. The command-issuing program 1602 is a program whereby a routine is executed for issuing a pair operation command for the local replication function and a pair operation command for asynchronous remote copying. The term "pair" herein refers to the pair made up of the copy source volume and copy target volume of remote copying. The periodic I/O program 1603 is a program whereby a routine is executed for issuing write data to the storage systems 131 when no I/O occurs from the host 111 to the storage systems 131 for a certain period of time or longer.

Figure 17:
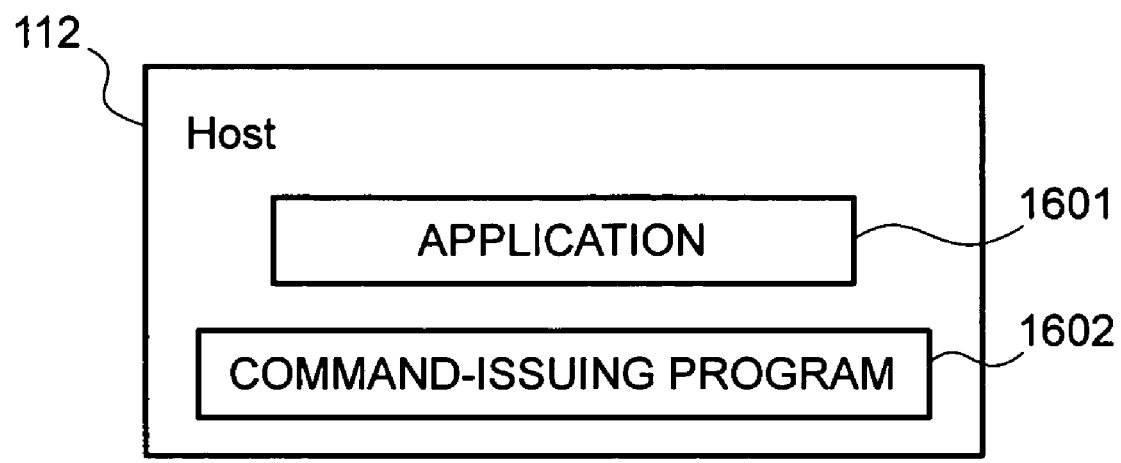
FIG. 17 is a diagram depicting an example of the software configuration of the sub-site host.

FIG. 17 is a diagram depicting an example of the functional configuration or software configuration of the host 112.

The application 1601 and command-issuing program 1602 of the host 112 are equivalent to those of the host 111. The application 1601 of the host 112 is usually suspended; and, when a failure occurs and service is continued by the sub-site, the user uses the application 1601 to resume service.

Figure 2:
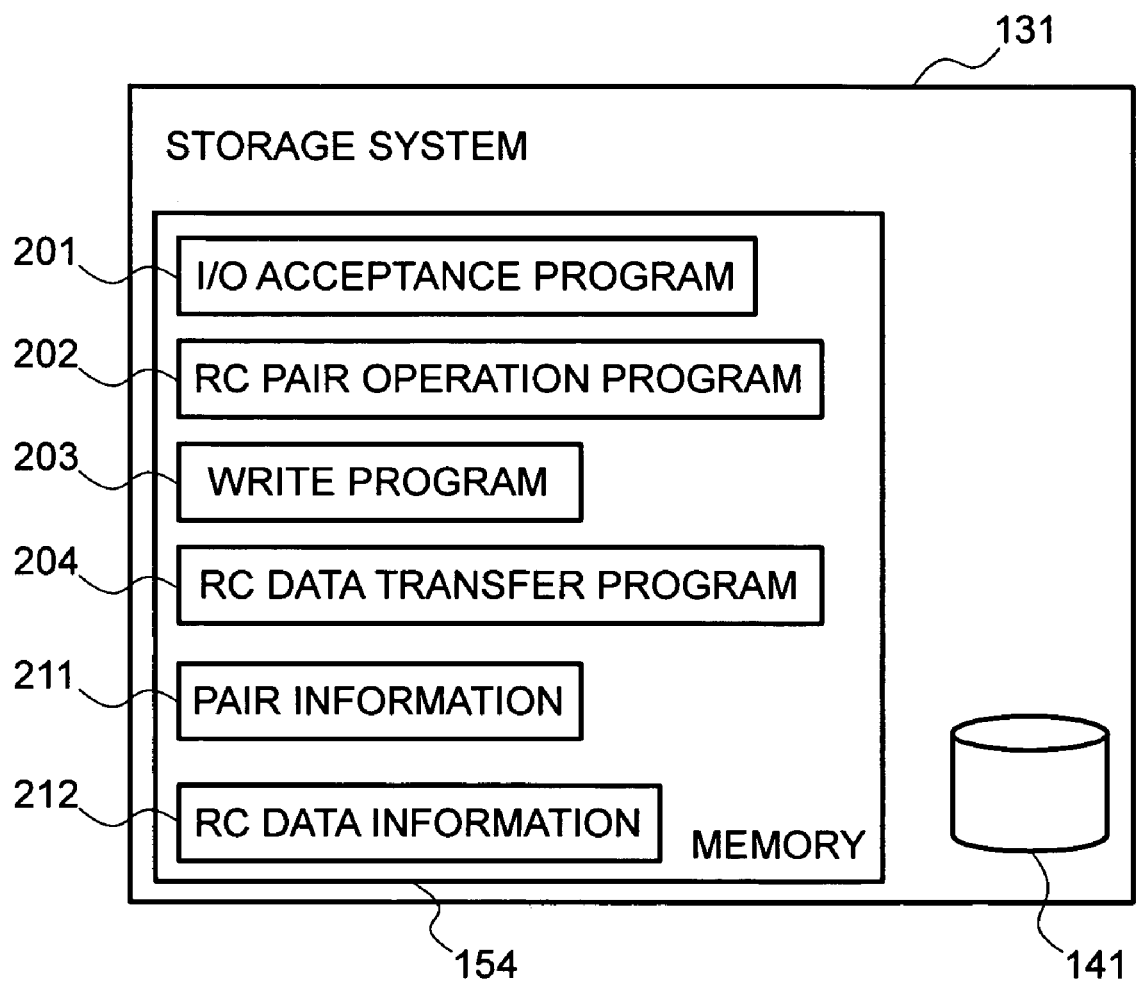
FIG. 2 is a diagram depicting an example of the functional configuration of the storage systems contained at the main site.

FIG. 2 is a diagram depicting an example of the functional configuration of the storage systems 131 contained at the main site 101.

The I/O acceptance program 201, the RC pair operation program 202, the write program 203, the RC data transfer program 204, the pair information 211, and the RC data information 212 are stored in the memory 154 of the storage systems 131. Each of the programs is executed by the processor 153 in the storage systems 131. "RC" as used herein is an abbreviation for "remote copying." Also, the pair information 211 and the RC data information 212 may be stored in the volume in the storage systems.

The I/O acceptance program 201 is a program whereby a routine is executed for receiving the data written from the host 111.

The RC pair operation program 202 is a program whereby a routine is executed for performing an operation (hereinafter referred to as a pair operation) in which a pair operation command is received from the host 111, and an asynchronous remote copy pair is created.

The write program 203 is a program whereby a routine is executed for writing, to the volume 141, the write data received by the I/O acceptance program 201.

The RC data information 212 stores data written from the host 111 to which information is attached for transfer by asynchronous remote copying. The term "information to perform a transfer by asynchronous remote copying" used herein refers to the address of the logical volume (hereinafter referred to as LUID) that is the data write target, a serial number or equivalent additional information (hereinafter referred to as the SEQ#) designed to ensure sequencing, and the write time. Details thereof are shown in FIG. 5.

The RC data transfer program 204 is a program whereby a routine is executed for attaching information, to perform a transfer by asynchronous remote copying, to the data written in the storage systems 131 from the host 111, and for transferring the data written in the storage systems 131 from the host 111 to the storage systems 132.

The pair information 211 is information relating to the pair targeted for asynchronous remote copying, and it is information indicating the correspondence of the asynchronous remote copying source logical volume 141 to the asynchronous remote copying target logical volume 142, and also indicating the state of the pair composed of the volume 141 and the volume 142. Details thereof are shown in FIG. 4. Also, the volume 141 and the volume 142 may each have a plurality of logical volumes therein. The pair information 211 shown in FIG. 4 is an example of a case in which a plurality of logical volumes is contained in a volume.

In asynchronous remote copying, the pair state is defined and administered as pair information in order to indicate the copy state. The pair state of the asynchronous remote copying is information for indicating the copy state to the administrator of remote copying. The administrator controls the copy processing of the asynchronous remote copying by instructing the transit of the pair state using a command. The pair state of asynchronous remote copying will be described hereinafter.

In the present embodiment, the pair state is defined as Simplex (X), Initial-Copying (IC), Duplex (D), Suspend (S), Duplex-Pending (DP), and Suspending (SG).

The Simplex state is the state in which copying between the copy source (hereinafter referred to as a source) and the copy target (target hereinafter) has not been initiated.

The Initial-Copying state is the state in which copying is initiated between the source and target volumes until transit occurs from the Simplex state to the Duplex state to be described hereinafter. During the Initial-Copying state, initialization copying from the source volume (source volume hereinafter) to the target volume (target volume hereinafter), specifically, copying of the data already stored in the source volume, is performed. When initialization copying is completed and the necessary internal processing for the transit to the Duplex state has ended, the pair state becomes the Duplex state.

The Duplex state is the state in which initialization copying is completed and update copying is performed; specifically, the state in which the data written in the source volume is update copied in the target volume in a case in which data is written from the host to the source volume. Macroscopically, the volume data is considered to be the same between the source and target as a result of the pair state becoming the Duplex state. However, update copying is performed asynchronously, so that the uniformity of the data stored at the main site and the sub-site is not strictly ensured.

The Suspend state is the state in which update copying is suspended. In the Suspend state, the uniformity of data between the source and target volumes is no longer ensured. For example, the pair state transitions to the Suspend state upon command from an operator, the host, a computer administrating the storage system, or the like.

When copying of data from the source volume to the target volume becomes impossible due to a cause other than a command from an operator, the host, a computer administrating the storage system, or the like, the storage system automatically transitions the pair state to the Suspend state (hereinafter referred to as the failure Suspend state). Possible causes for the failure Suspend state are a failure of the source volume or target volume, a failure of the source or target storage system, a communication channel failure between the source volume and target volume (in the case of the present embodiment, a failure in the network 122 for connecting the storage system 101 with the storage system 102). However, another failure may also cause a failure Suspend state.

The Suspending state is the state which occurs from the Duplex state until transit to the Suspend state. The failure Suspend state is also included in the Suspend state. In the present embodiment, the source and target storage systems perform processing for reflecting the data of both storage systems in the target storage system in the Suspending state.

The Duplex-Pending state is the state which occurs from the Suspend state until transit to the Duplex state. In the Duplex-Pending state, the data stored in the source volume is copied to the target volume in order to unify the data of the source volume with that of the target volume. After uniformity is secured between the data of the source volume and that of the target volume, the pair state becomes the Duplex state. Also, copying of the data in the Duplex-Pending state may involve a differential copy process for copying only that portion which needs to be updated using information recorded in the update area of data written in the source volume or target volume during the aforementioned Suspend state. The Initial-Copying state and Duplex-Pending state may be combined into one state and displayed on the screen of an administration device, or they may be displayed in an alternating manner.

Figure 3:
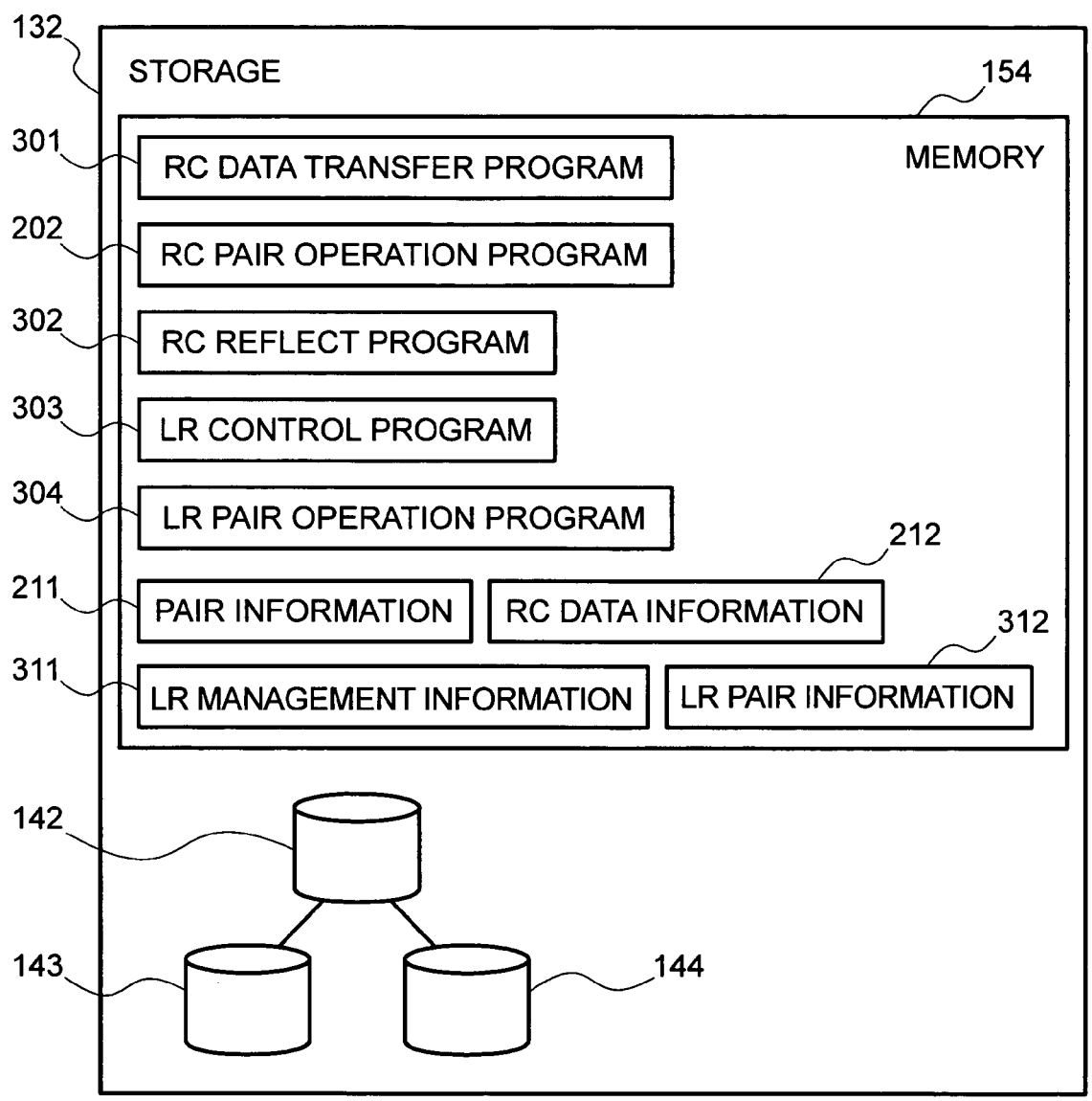
FIG. 3 is a diagram depicting an example of the functional configuration of the storage systems contained at the sub-site.

FIG. 3 is a diagram depicting an example of the functional configuration of the storage systems 132 contained at the sub-site 102.

The RC data transfer program 301, the RC pair operation program 202, the RC reflect program 302, the LR control program 303, the LR pair operation program 304, the pair information 211, the RC data information 212, the LR management information 311, and the LR pair information 312 are stored in the memory 154 of the storage systems 132. Each program is executed by the processor 153 in the storage systems 131. "LR" as used herein is an abbreviation for local remote copying.

The RC data transfer program 301 is a program whereby a routine is executed for receiving data transferred from the storage systems 131.

The RC pair operation program 202 is a program whereby a routine is executed for performing an operation in which a pair operation command is received from the host 112, and an asynchronous remote copy pair is created.

The RC reflect program 302 is a program whereby a routine is executed for writing, to the volume 142, the data received by the RC data transfer program 301 in the order that the data has been written to the volume 141 based on the SEQ# or write time. The processing executed by the RC reflect program 302 will be referred to hereinafter as "reflecting." Also, the method in which sequencing is ensured and a volume is written to based on the SEQ# is the same as the conventional method, and so a description thereof is omitted.

In the storage systems 132, the volume 143 and the volume 144 which are replicas of the volume 142, are created using the local replication function. The local replication function is executed by both the LR control program 303 and the LR pair operation program 304.

The LR control program 303 is a program whereby a routine is executed for writing the data written in the volume 142 to the volume 143 or volume 144 on the basis of the LR pair information 312.

Figure 11:
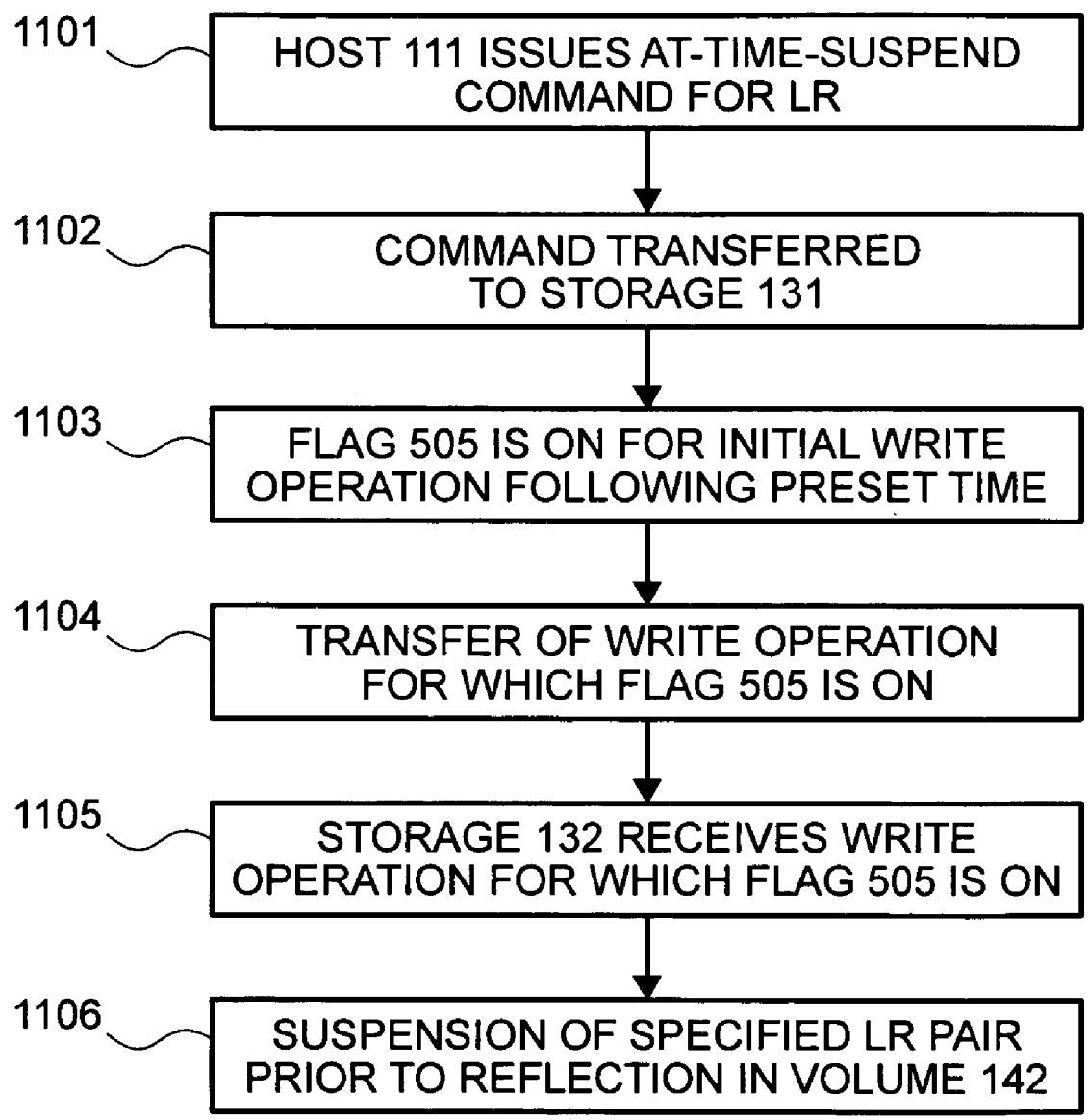
FIG. 11 is a flow diagram depicting an example of the processing for executing an At-Time-Suspend of the local replication function.

The LR pair operation program 304 is a program for executing processing whereby the following two instructions are received from the host 111 or host 112: a Suspend command for suspending the copying to another volume of data that is stored in a certain volume and that has a write time that is after a certain time specified by the host 111 or host 112 (hereinafter referred to as At-Time-Suspend; the details of which are illustrated in FIG. 11), and a Resync command for unifying the data stored in a certain volume with the data stored in another volume. The routine is performed for the state of a pair that indicates a combination of the volume 142 with the volume 143, or the volume 142 with the volume 144 (hereinafter referred to as a "LR pair"). The pair composed of the volume 142 and the volume 143 will be referred to hereinafter as LR1, and the pair composed of the volume 142 and the volume 144 will be referred to as LR2. In At-Time-Suspend, the pair state of the pair specified by the At-Time-Suspend command is transitioned to the Suspend state immediately before the writing of data having a write time that is after the time specified by the At-Time-Suspend command.

Figure 6:
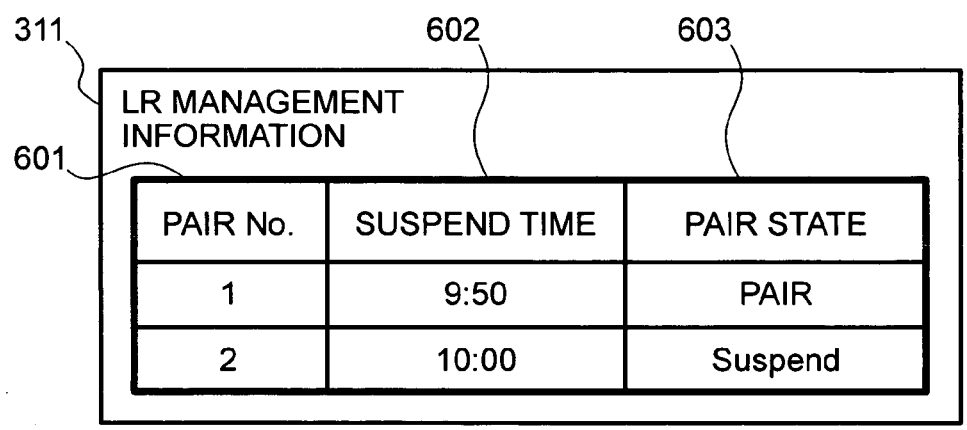
FIG. 6 is a diagram depicting an example of the LR management information.

The LR management information 311 is designed to indicate the state of the LR pair. Details of the LR management information 311 are shown in FIG. 6.

Figure 7:
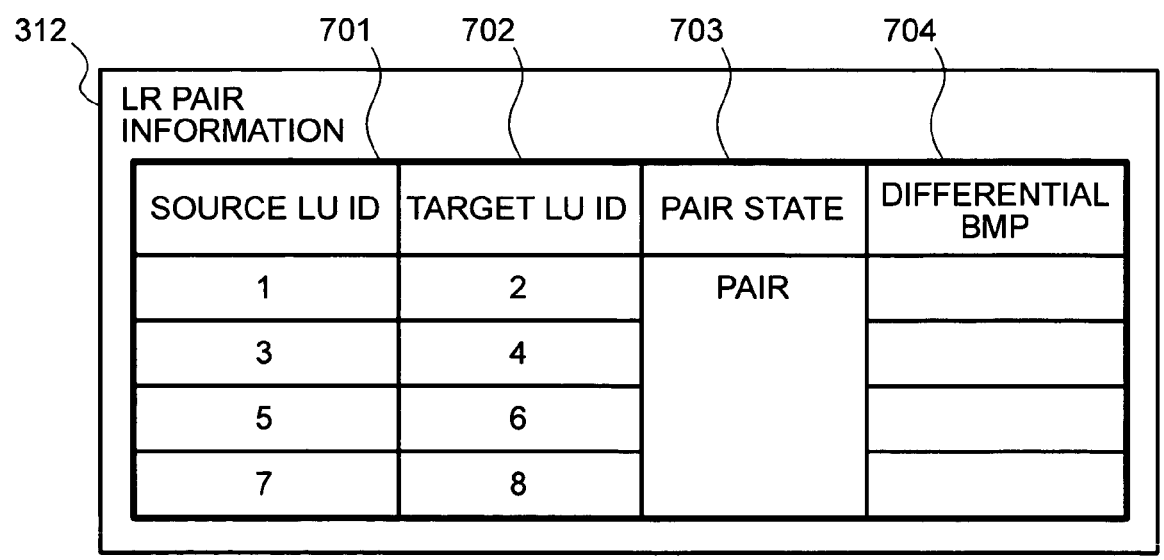
FIG. 7 is a diagram depicting an example of the RC pair information.

The LR pair information 312 is information relating to the pair of the local replication function and is information for indicating the correspondence between the copy source volume and copy target volume of the data, and the state of the pair. Details of the LR pair information 312 are shown in FIG. 7.

In the local replication function, the pair state is defined and administered as pair information in order to indicate the copy state. The pair state of the local replication function is information for indicating the copy state to the administrator of local replication. The administrator controls the copy processing of the local replication function by instructing transit of the pair state using a command. The pair state may be defined as Simplex (X), Initial-Copying (IC), Duplex (P), Suspend (S), Suspending (SG), and Resyncing (R). The pair state of the LR pair will be described hereinafter. States other than the Resyncing state are equivalent to the definitions of the pair states of the RC pair described above, and so a description thereof is omitted.

The Resyncing state is the state which occurs from the Suspend state until transit to the Duplex state. In the Resyncing state, copying of data from the source volume to the target volume is executed in order to unify the data of the source volume with that of the target volume. When unity is ensured between the data of the source volume and that of the target volume, the pair state becomes the Duplex state. Also, in the present embodiment, a changeover to the Suspend state occurs when the pair state is the Duplex state. Consequently, control may be performed so that the pair state becomes the Duplex state immediately after a Resync command is issued, so as to promptly change the pair state from the Duplex state to the Suspend state. The command for instructing the pair state to become Duplex immediately after the Resync command is issued is referred to hereinafter as a Quick-Resync command. There exists a system whereby background copying is caused to be executed after the pair state has become Duplex and all data copying is performed in the target volume at the time when the Quick-Resync command is issued. Another system is a system whereby all copying is performed after the next Quick-Suspend (Quick-Suspend will be described hereinafter) is received without performing copying in the Duplex state.

Copying of data in the Resyncing state may also be performed using a differential copy process for copying only that portion which needs to be updated using information recorded in the update area of data during the aforementioned Suspend state.

The consistency of the target volume with the data stored in the source volume at the time the Suspend command was issued is ensured during the Suspend state of the local replication function.

The pair state may also become "Suspend" immediately after the Suspend command is issued in the local replication function of the present embodiment. The command for instructing the pair state to become Suspend immediately after the Suspend command is issued will be referred to hereinafter as a Quick-Suspend command. There exists a system whereby background copying is caused to be executed after the pair state becomes Suspend and all data copying is performed in the target volume when the Quick-Suspend command is issued, and a system whereby copying is performed as a snapshot as needed.

Figure 15:
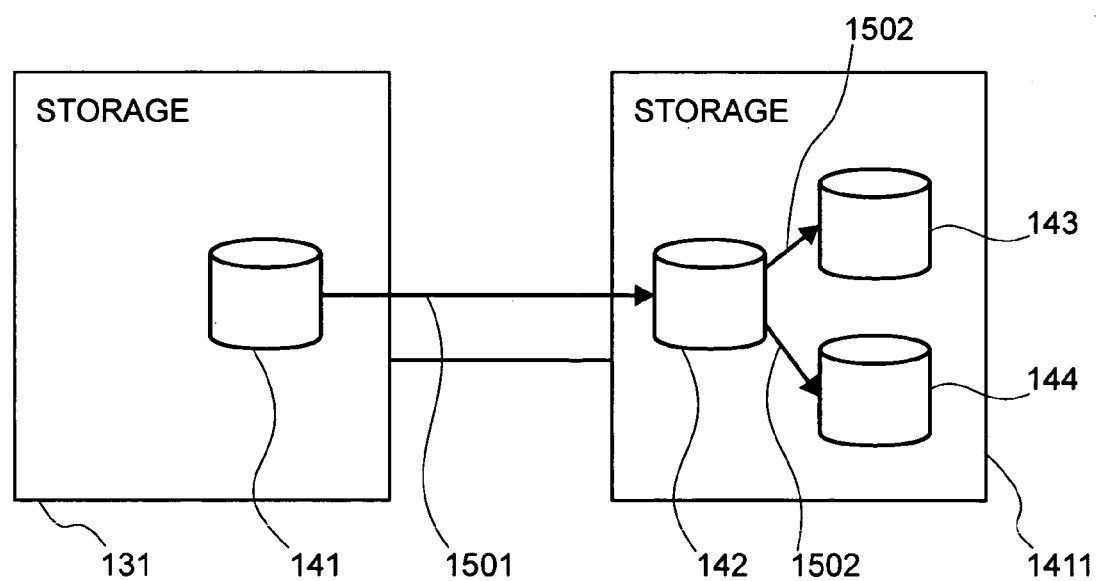
FIG. 15 is a diagram depicting an example of a pair in the asynchronous remote copying and the local replication function.

FIG. 15 is a diagram depicting an example of a pair in the asynchronous remote copying and local replication function of the present embodiment.

In the pair 1501, the data stored in the volume 141 is copied to the volume 142 in an asynchronous remote fashion. The pair 1501 is usually in the Duplex state.

In the pair 1502, the data stored in the volume 142 is copied to the volume 143 by the local replication function based on the write time attached to the data.

In the pair 1503, the data stored in the volume 142 is copied to the volume 144 by the local replication function based on the write time attached to the data.

In the present embodiment, the storage systems 132 are controlled so that the pair state of either of the pair 1502 or the pair 1503 is always in the Suspend state. The pair that is in the Duplex state is set to the Suspend state, and, after the Suspend state is completed, the other pair is set to the Resync state. By repeating this operation, data that is consistent with the volume 142 at a certain time is stored in the volume 143 or in the volume 144.

FIG. 4 is a diagram depicting an example of the pair information 211.

The pair information 211 has a logical volume number for the source volume (hereinafter referred to as source LU ID) 401; a logical volume number for the target volume that corresponds to the source volume (target LU ID hereinafter) 402; a pair state 403 for indicating the pair state of the target volume and the source volume; and a differential bitmap 404 for indicating the memory area in which there is a further difference in data between the source LU ID and the target LU ID.

FIG. 5 is a diagram depicting an example of the RC data information 212.

Figure 13:
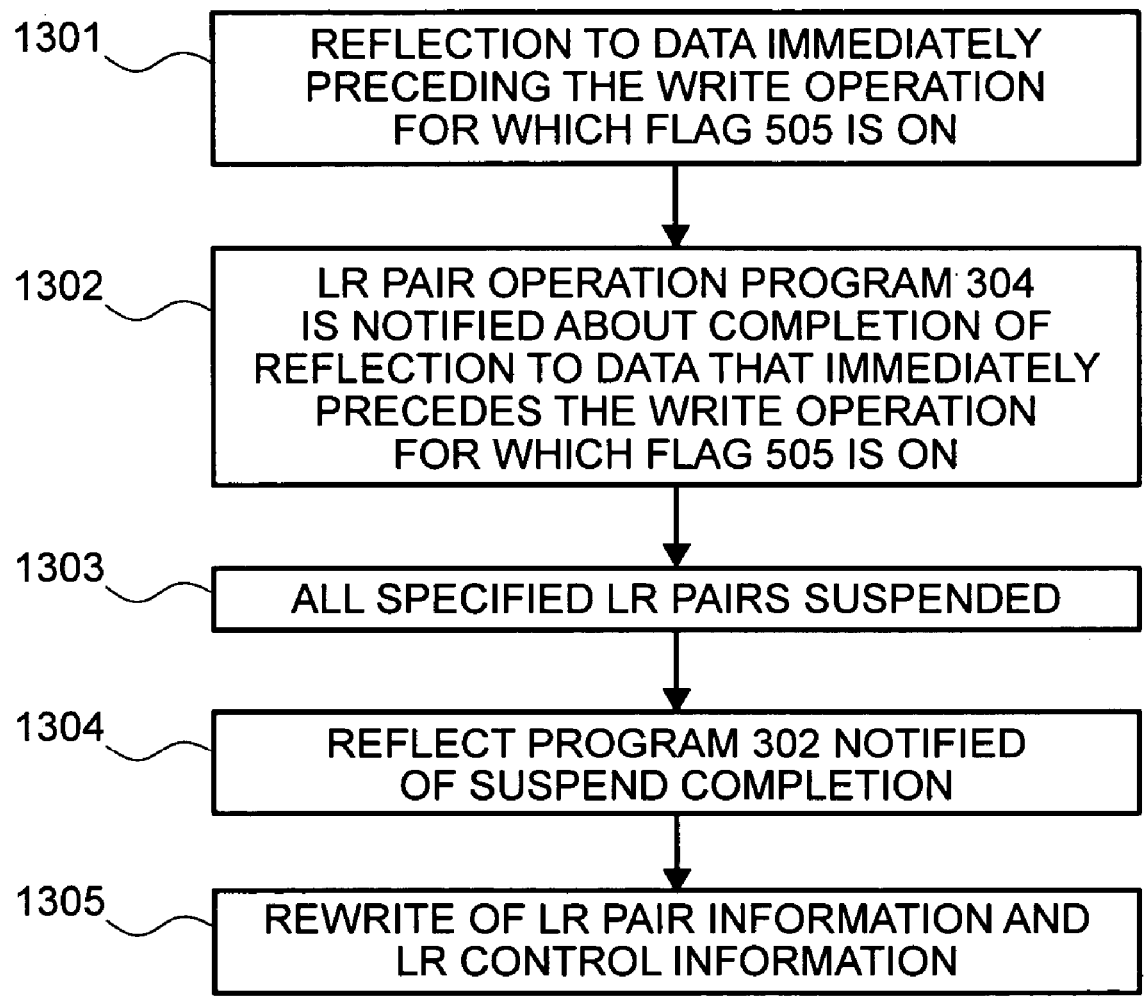
FIG. 13 is a flow diagram depicting an example of the operation whereby At-Time-Suspend is performed for the LR pair.

The RC data information 212 administers the data written in the write storage systems 131 from the host 111; specifically, the data transferred by asynchronous remote copying from the storage systems 131 to the storage systems 132. The RC data information 212 has the target LUID 501 of the data transferred by asynchronous remote copying, the SEQ # 502 attached by the RC data transfer program 204, the time stamp 503 attached by the host 111, the data 504 transferred by asynchronous remote copying, and the Flag 505. The Flag 505 is designed to indicate the timing at which the At-Time-Suspend command is executed. The RC reflect program 302 receives the write data for which the Flag 505 is ON; specifically, for which a 1 is stored in the Flag 505, whereupon the pair state of the LR is set to the Suspend state before reflection. Details thereof are shown in FIG. 13.

FIG. 6 is a diagram depicting an example of the LR management information 311.

The LR management information 311 administers the pair information of the LR pair and the time suspended by the At-Time-Suspend. The LR management information 311 administers LR pair No. 601 for identifying the LR pair, the Suspend time 602 for recording the newest specified time of the At-Time-Suspend for each pair, and the pair state 603 of each LR pair.

FIG. 7 is a diagram depicting an example of the LR pair information 312.

The LR pair information 312 administers the correspondence between the source volume and the target volume. The LR pair information 312 administers the source LU ID 701 of the LR pair and the target LU ID 702 of the LR pair, the pair state 703, and the differential bitmap 704 for indicating whether a difference exists between the data of the source LU ID and that of the target LU ID.

An example of the operation of the present embodiment will be described hereinafter. In this example, an instruction from the host 111 or host 112 is issued to the plurality of storage systems 131 shown in FIG. 1 or to the plurality of storage systems 132, and the plurality of storage systems 131 or plurality of storage systems 132 execute the instructed processing based on the instruction from the host 111 or host 112.

Figure 8:
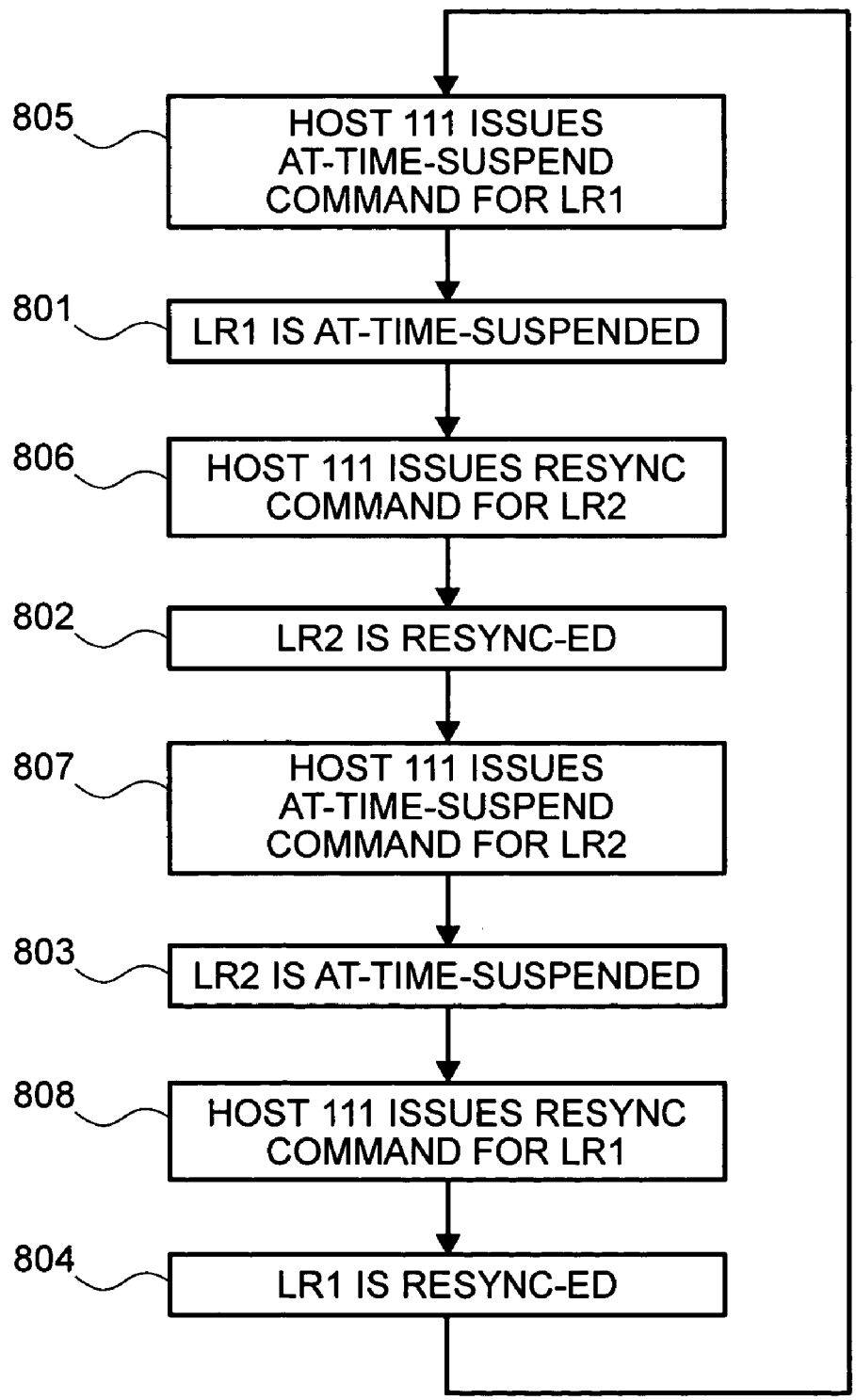
FIG. 8 is a flow diagram depicting an example of the processing flow of the operation of LR pairs LR1 and LR2 during normal operation.

FIG. 8 is a flow diagram depicting an example of the operation of the LR pairs LR1 and LR2 during normal operation. In the initial step, the LR1 pair is in the Duplex state, and the LR2 pair is in the Suspend state.

First, the command-issuing program 2202 of the host 111 specifies the same time and issues the At-Time-Suspend command of LR1 to the RC reflect program 302 of each of the plurality of storage systems 132 via the RC data transfer program 204 of the storage systems 131 (step 801).

The LR pair operation program 304 of each of the plurality of storage systems 132 then sets the pair state of LR1 that has assumed the Duplex state to the Suspend state according to the At-Time-Suspend command. Details thereof are shown in FIG. 11. By setting the pair state of the pair LR1 of each of the plurality of storage systems 132 to the Suspend state based on the same time, consistent data is stored, for the data to which a time is attached, that is before the time specified by the At-Time-Suspend command, in the volume 143 of the other storage systems 132 at the time specified by the At-Time-Suspend command, to a certain volume 143 of the storage systems 132 (step 802).

The command-issuing program 2202 of the host 111 then issues an LR2 Resync command to the LR pair operation program 304 of each of the plurality of storage systems 132 via the storage systems 131 (step 803).

The LR pair operation program 304 of each of the plurality of storage systems 132 then sets the pair state of LR2 that has assumed the Suspend state to the Duplex state according to the Resync command (step 804).

The command-issuing program 2202 of the host 111 then specifies the same time and issues the At-Time-Suspend command of LR2 to the RC reflect program 302 of each of the plurality of storage systems 132 via the RC data transfer program 204 of the storage systems 131 (step 805).

The LR pair operation program 304 of each of the plurality of storage systems 132 then sets the pair state of LR2 that has assumed the Duplex state to the Suspend state according to the At-Time-Suspend command. By setting the pair state of the pair LR2 of each of the plurality of storage systems 132 to the Suspend state based on the same time, consistent data is stored for the data to which a time is attached that is before the time specified by the At-Time-Suspend command in the volume 144 of the other storage systems 132 at the time specified by the At-Time-Suspend command to a certain volume 144 of the storage systems 132 (step 806).

The command-issuing program 2202 of the host 111 then issues an LR1 Resync command to the LR pair operation program 304 of each of the plurality of storage systems 132 via the storage systems 131 (step 807).

The LR pair operation program 304 then returns the pair state of LR2 that has assumed the Suspend state to the Duplex state according to the Resync command and returns to step 801 (step 808).

Figure 9:
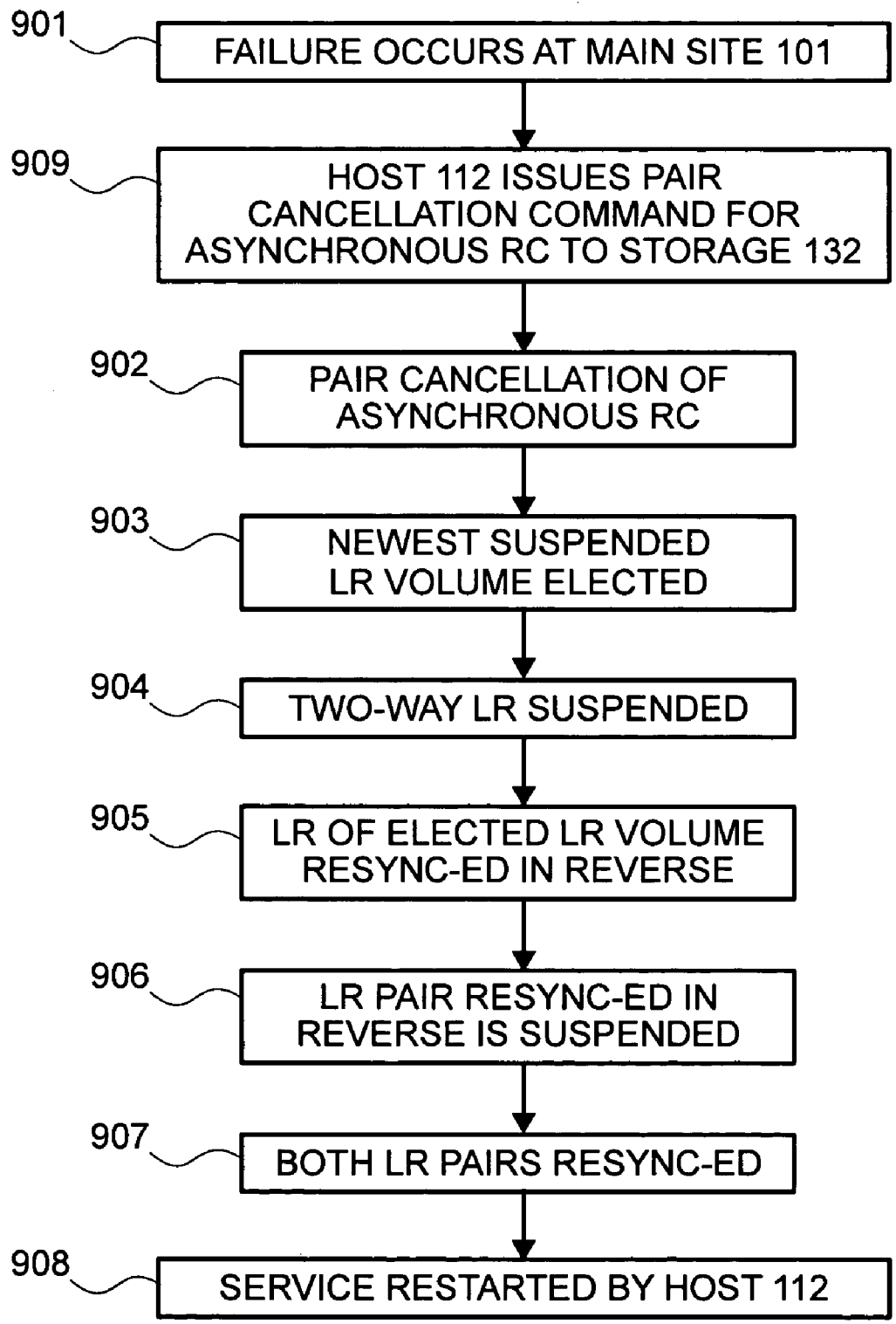
FIG. 9 is a flow diagram depicting an example of the processing flow whereby service is restarted at the sub-site after a failure occurs at the main site.

FIG. 9 is a flow diagram depicting an example of the processing which occurs until service is restarted in the host 112 after a failure occurs at the main site.

The host 112 of the sub-site detects that a failure has occurred at the main site. Also, a failure at the main site may be detected by a system administrator instead of by the host 112 (step 901).

The command-issuing program 2202 of the host 112 then issues to the RC pair operation program 202 of each of the plurality of storage systems 132 a command for canceling the asynchronous remote copy pair (step 902).

The RC pair operation program 202 of each of the plurality of storage systems 132 then cancels the asynchronous remote copy pair and sets the pair state to the Simplex state (step 903).

Figure 12:
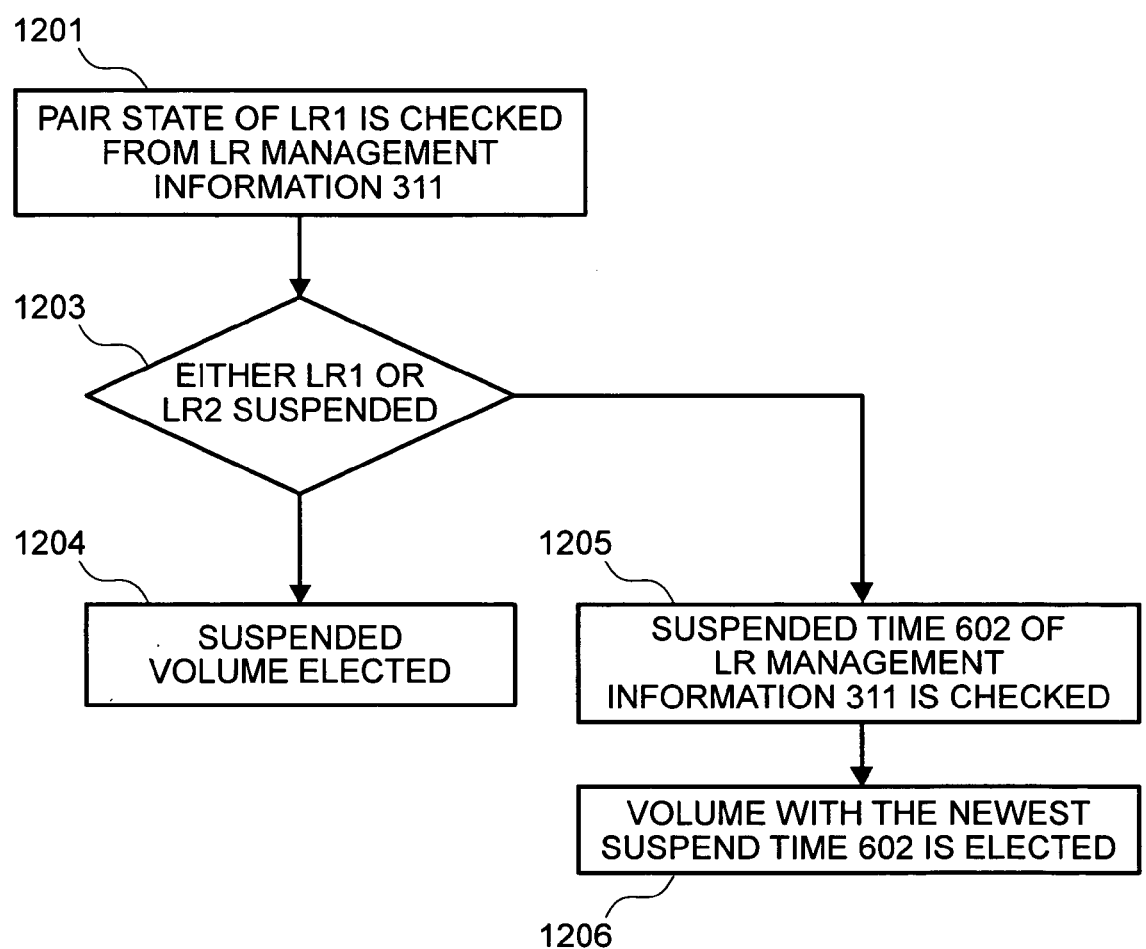
FIG. 12 is a flow diagram depicting an example of the LR volume election operation when a failure occurs.

The LR control program 303 of each of the plurality of storage systems 132 then elects from the volume 143 or volume 144 the newest LR volume that is consistent with the volume 142 at a certain time (details thereof are shown in FIG. 12) (step 904).

The LR pair operation program 304 of each of the plurality of storage systems 132 then sets the LR pair made up of pairs LR1 and LR2 to the Suspend state (step 905).

The LR control program 303 of each of the plurality of storage systems 132 then copies, to the volume 142, the data of the LR volume elected in step 904. The LR control program 303 of each of the plurality of storage systems 132 may instruct the LR pair operation program 304 to set the LR pair to the Resync state and to use a differential copy process when copying the data of the LR volume elected in step 904 to the volume 142 (step 906).

The LR control program 303 of each of the plurality of storage systems 132 then sets, to the Suspend state, the LR pair that had been set to the Resync state in step 906 (step 907).

The LR control program 303 of each of the plurality of storage systems 132 then sets, to the Resync state, the LR pair that is not the LR pair set to the Resync state in step 905 (step 908).

Service is then restarted in the host 112 (step 909).

Figure 10:
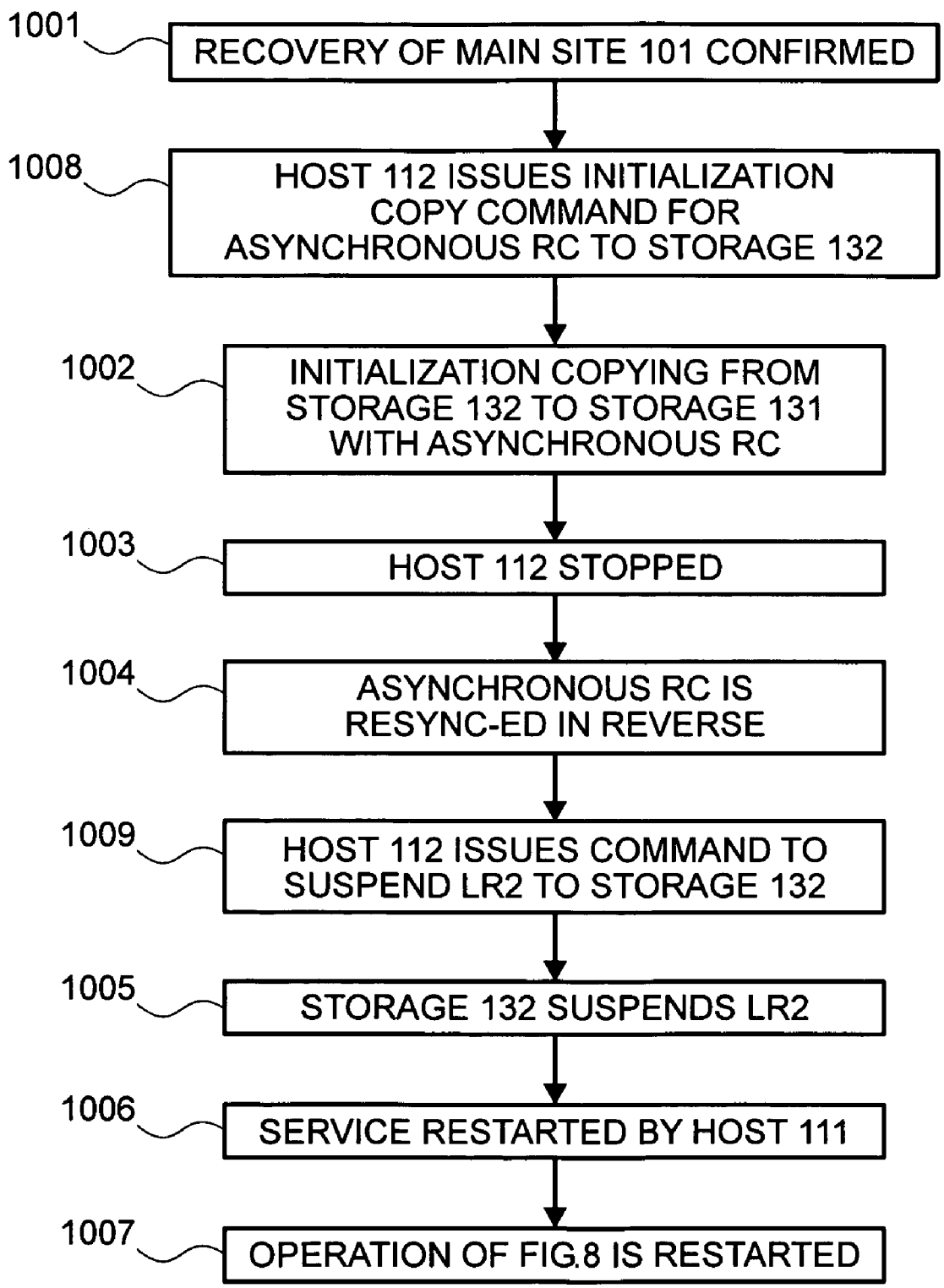
FIG. 10 is a flow diagram depicting an example of the processing whereby the main site is recovered and service is restarted at the main site after restarting service at the sub-site.

FIG. 10 is a flow diagram depicting an example of the processing which occurs until the main site 101 is recovered and service is restarted in the host 111 after restarting service in the sub-site 102.

First, the administrator confirms recovery of the main site 101 (step 1001).

The command-issuing program 2202 of the host 112 then issues an initialization copy command for asynchronous remote copying to each of the plurality of storage systems 132 according to an instruction of the administrator from an administration terminal connected to the information processing system (step 1002).

Each of the plurality of storage systems 132 then performs initialization copying of asynchronous remote copying to the storage systems 131 (step 1003).

When the administrator finishes confirming from the administration terminal that the processing of step 1003 is completed, an instruction is issued to suspend the service of the host 112 (step 1004).

According to the command of the administrator from the administration terminal, the RC pair operation program 202 of each of the plurality of storage systems 132 then changes the asynchronous remote copying, from the storage systems 132 to the storage systems 131, to asynchronous remote copying from the storage systems 131 to the storage systems 132 (step 1005).

The administrator then confirms from the administration terminal that the change has been made to asynchronous remote copying from the storage systems 131 to the storage systems 132, whereupon the command-issuing program 2202 of the host 112 issues a command to the LR pair operation program 304 of each of the plurality of storage systems 132 to set LR2 to the Suspend state according to the instruction of the administrator from the administration terminal (step 1006).

The LR pair operation program 304 of each of the plurality of storage systems 132 then sets LR2 to the Suspend state (step 1007).

The administrator then restarts service in the administration host 111 (step 1008).

The normal operation shown in FIG. 8 is then restarted (step 1009).

FIG. 11 is a flow diagram depicting an example of the At-Time-Suspend operation of the local replication function.

First, the command-issuing program 2202 of the host 111 issues an At-Time-Suspend command for the LR pair to the RC data transfer program 204 of each of the plurality of storage systems 131 (step 1101).

The RC data transfer program 204 of each of the plurality of storage systems 131 then sets, to ON, the Flag 505 of the RC data information 212 for the first write after the time specified by the At-Time-Suspend command. Also, the Flag 505 may be set to ON when the RC reflect program 302 has received data instead of the RC data transfer program 204 (step 1103).

The RC data transfer program 204 of each of the plurality of storage systems 131 then transfers to the storage systems 132 the specified time of the At-Time-Suspend command and the write data for which the Flag 505 was set to the ON state (step 1104).

The LR control program 303 of the storage systems 132 then receives from the storage systems 131 the write data for which the Flag 505 was set to the ON state and the specified time of the At-Time-Suspend command (step 1105).

The RC reflect program 302 then issues a command to the LR pair operation program 304 of each of the plurality of storage systems 132 just before reflecting, in the volume 142, the write data for which the Flag 505 was set to ON, so as to set the LR pair specified by the At-Time-Suspend command to the Suspend state, and rewrites the Suspend time 602 of the LR pair information 312. The flow involved in setting the LR pair to the Suspend state is shown in FIG. 13 (step 1106).

FIG. 12 is a flow diagram of the LR volume election operation executed by each of the plurality of storage systems 132 in step 904 of FIG. 9.

First, the LR pair operation program 304 of each of the plurality of storage systems 132 checks the pair state 603 of the pairs LR1 and LR2 from the LR management information 311 (step 1201).

The LR pair operation program 304 of each of the plurality of storage systems 132 then determines whether the pair state of the pairs LR1 and LR2 is the Suspend state, and the process proceeds to step 1204 if the pair state of either the LR1 or LR2 is the Suspend state, and proceeds to step 1205 if the pair state of both LR1 and LR2 is the Suspend state. At this time, if the pair state is the Suspending state or the Resyncing state, the process waits until each is transitioned to the Suspend state or the Resync state. No cases are encountered in which the pair state of both LR1 and LR2 is the Resync state or Duplex state (step 1203).

In step 1204, the LR control program 303 of each of the plurality of storage systems 132 elects, from among the pairs LR1 and LR2, the pair whose pair state is the Suspend state.

In step 1205, the LR pair operation program 304 of each of the plurality of storage systems 132 checks the Suspend time 602 of LR1 and LR2 from the LR management information 311 (step 1205).

The LR pair operation program 304 of each of the plurality of storage systems 132 then elects the LR pair with the newest Suspend time 602 of the pairs LR1 and LR2 (step 1206).

FIG. 13 is a flow diagram depicting an example of the operation executed by each of the plurality of storage systems 132 in step 1106 of FIG. 11.

First, the RC reflect program 302 of each of the plurality of storage systems 132 performs reflection up to the write data having the SEQ# immediately preceding the write data for which the Flag 505 is ON (step 1301).

The RC reflect program 302 of each of the plurality of storage systems 132 then notifies the LR pair operation program 304 that reflection is completed up to the point immediately preceding the write data for which the Flag 505 is ON (step 1302).

The LR pair operation program 304 of each of the plurality of storage systems 132 then receives notification that reflection up to the point immediately preceding the write data for which the Flag 505 is ON is completed, whereupon the LR pair specified by the At-Time-Suspend is set to the Suspend state after the data up to the point immediately preceding the write data for which the Flag 505 is ON has been written to the volume 143 or the volume 144. At this time, a Quick-Split may be used (step 1303).

The LR pair operation program 304 of each of the plurality of storage systems 132 then notifies the RC reflect program 302 of Suspend completion. At this time, the pair state may be the Suspending state (step 1304).

The LR pair operation program 304 of each of the plurality of storage systems 132 rewrites the pair state 703 of the LR pair information 312 and the pair state 603 of the LR management information 311 to the Suspend state for the pair for which the pair operation was performed, and it writes the time specified by the At-Time-Suspend for the pair for which the pair operation was performed in regards to the Suspend time 602 of the LR management information 311 (step 1305).

In At-Time-Suspend, the Suspend state is not established if writing does not occur after the specified time for all of the storage systems 131. In order to prevent this, when writing has not occurred for longer than a certain time for one of the storage systems 131, the periodic I/O program 2203 of the host 111 carries out writing for that storage system. The absence of writing for longer than a certain time may also be prevented by initiating a write operation with the application 2201 or by some other method.

In the present embodiment, the consistency, at a certain time, of data stored in the volume at a first site and the data stored in the volume at a second site can be ensured without suspending asynchronous remote copying from the first site to the second site in an information processing system having a first site and a second site. In the specific case of a first site having a plurality of storage systems and a second site having a plurality of storage systems, the consistency between the data stored before a certain time in each of the plurality of storage systems of the second site and the data stored before a certain time in each of the plurality of storage systems of the first site is ensured when failure occurs in the first site.

Second Embodiment

In a second embodiment, the storage system of the sub-site creates a replica of the target volume of asynchronous remote copying at a certain time by using a snapshot function. The snapshot function provides the host with a replica volume (hereinafter referred to as a snapshot volume) of the copy source volume in virtual fashion. The action whereby the storage system provides a snapshot volume to the host in virtual fashion will be referred to hereinafter as creating a snapshot volume.

The system configuration, normal operation, and recovery method after failure according to the second embodiment will be described hereinafter.

The difference in the information processing system of the second embodiment from that of the first embodiment is that storage systems 1411 are used instead of the storage systems 132. Instead of the volume 143 and volume 144 of the storage systems 132, the storage systems 1411 have the virtual volume 1401 and the volume 1402 for storing data, and other aspects of their configuration are the same as in the storage systems 132.

Figure 18:
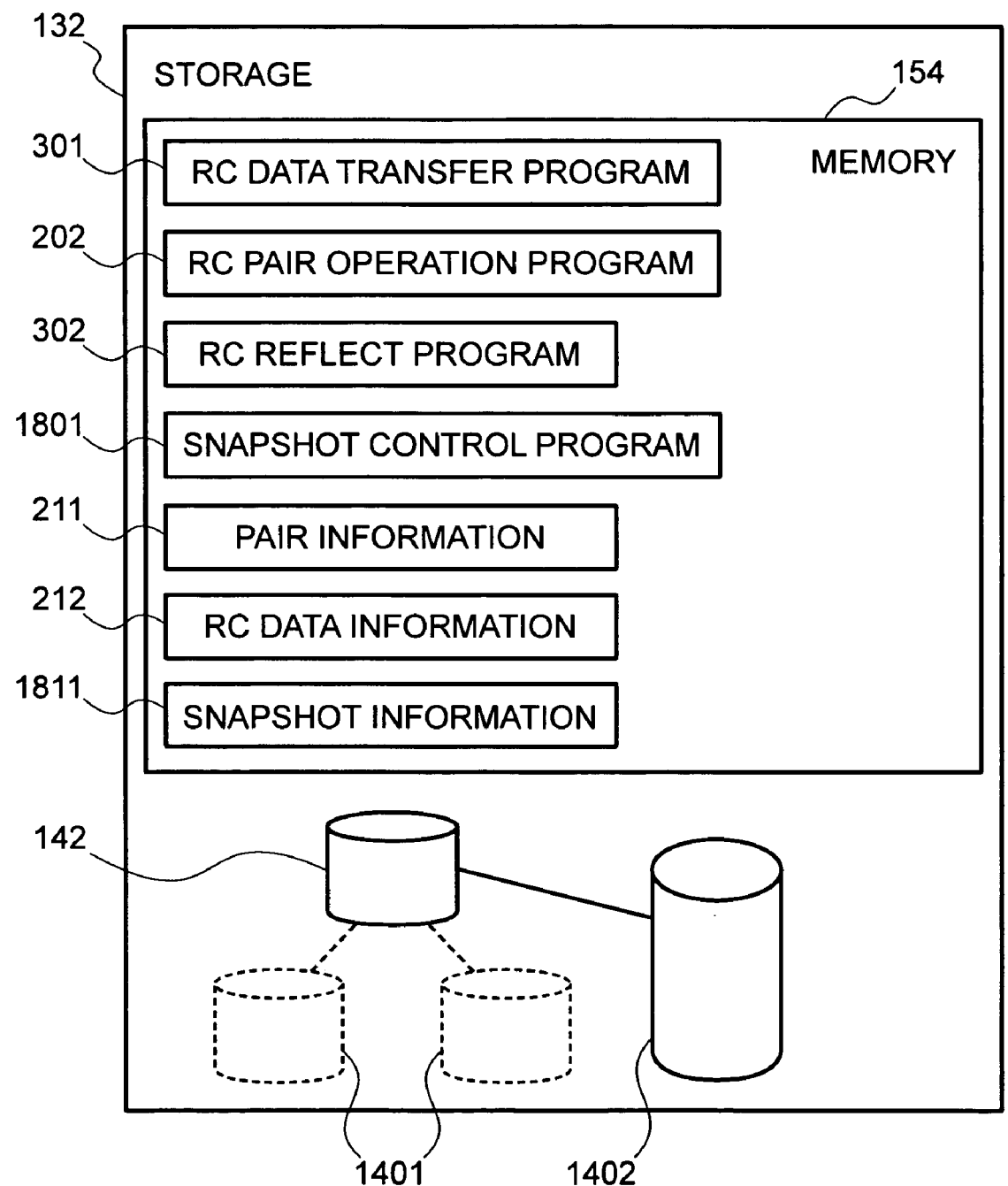
FIG. 18 is a diagram depicting an example of the functional configuration of the storage systems contained at the sub-site.

FIG. 18 is a diagram depicting an example of the functional configuration of the storage systems 1411 contained at the sub-site 102.

The RC data transfer program 301, the RC pair operation program 202, the RC reflect program 302, the snapshot control program 1801, the pair information 211, the RC data information 212, and the snapshot information 1811 are stored in memory 154 in the storage systems 1411. The programs are executed by the processor 153 in the storage systems 1411. Also, the pair information 211, the RC data information 212, and the snapshot information 1811 may be stored in the volume 142 or the volume 1402 in the storage systems 1411.

The program operation or information other than the snapshot control program 1801 and the snapshot information 1811 in this arrangement is equivalent to the first embodiment.

The snapshot control program 1801 is a program whereby a routine is executed for controlling the data written in the volume 142 based on the snapshot information 1811 and for controlling the creation, deletion, and the like of the snapshot volume.

The storage systems 1411 have a volume 142 for storing a copy of the data stored in the storage systems 131, the snapshot volume 1401 in which snapshot data from a certain time are virtually stored, and the volume 1402 to which the data written to the volume 142 prior to a certain time is saved if new data is written to the volume 142.

Figure 20:
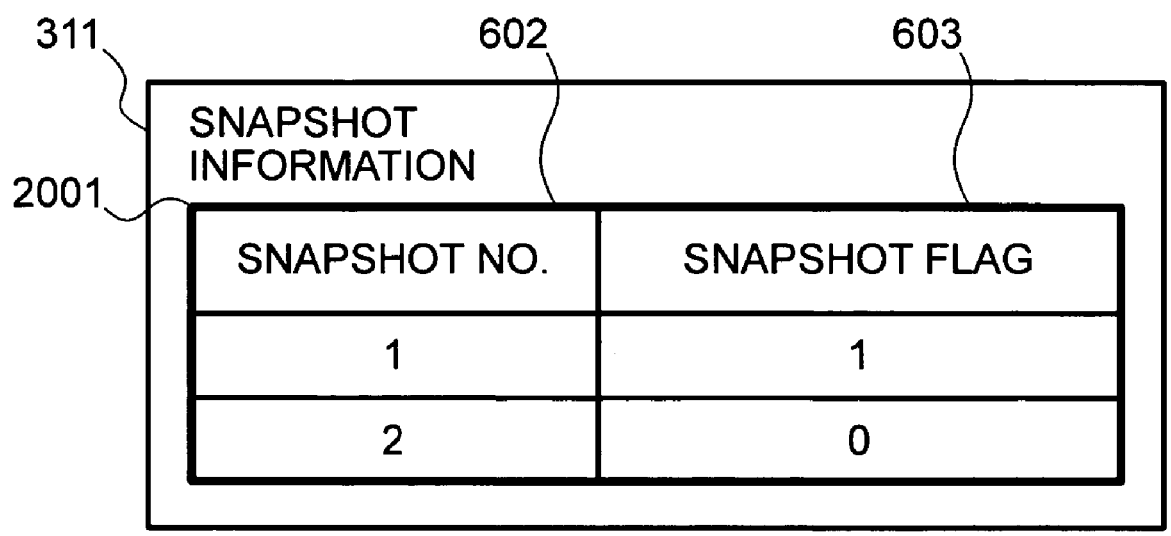
FIG. 20 is a diagram depicting an example of the snapshot information.

Details of the snapshot information 1811 are shown in FIG. 20.

Figure 14:
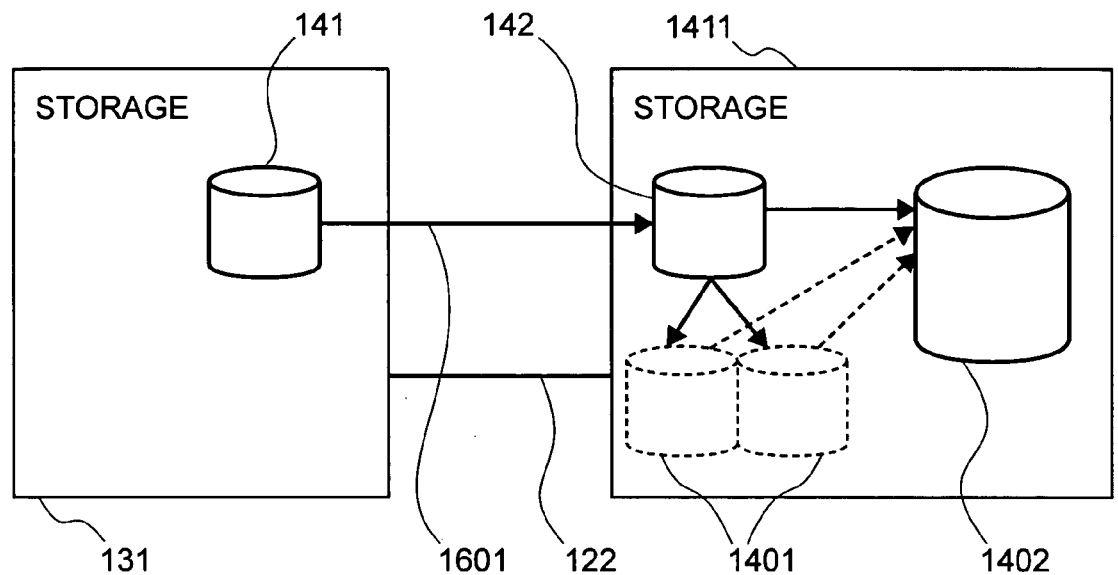
FIG. 14 is a diagram depicting an example of the snapshot operation used in the second embodiment.

FIG. 14 is a diagram depicting an example of a pair created by asynchronous remote copying and by the snapshot function of the present embodiment.

In the pair 1401, the data stored in the volume 141 is copied to the volume 142 in an asynchronous remote fashion. The pair 1401 is normally in the Duplex state.

In the present embodiment, each of the plurality of storage systems 1411 of the sub-site is controlled using the volume 1402 so as to maintain a state that always has the snapshot volume 1401. After creation of a new snapshot volume is completed, data that is consistent at a certain time among the plurality of storage systems 1411 is stored by repeating deletion of the old snapshot volume. Details thereof will be described hereinafter.

FIG. 20 is a diagram depicting an example of the snapshot information 1811. The snapshot information 1811 has a snapshot No. 2001 and a snapshot Flag 2002.

The snapshot No. 2001 is a number for uniquely identifying the created snapshot volume. The snapshot Flag 2002 is designed to determine the newest snapshot volume, and the snapshot volume for which the snapshot Flag 2002 is ON is elected during recovery of the main site from a failure.

Figure 19:
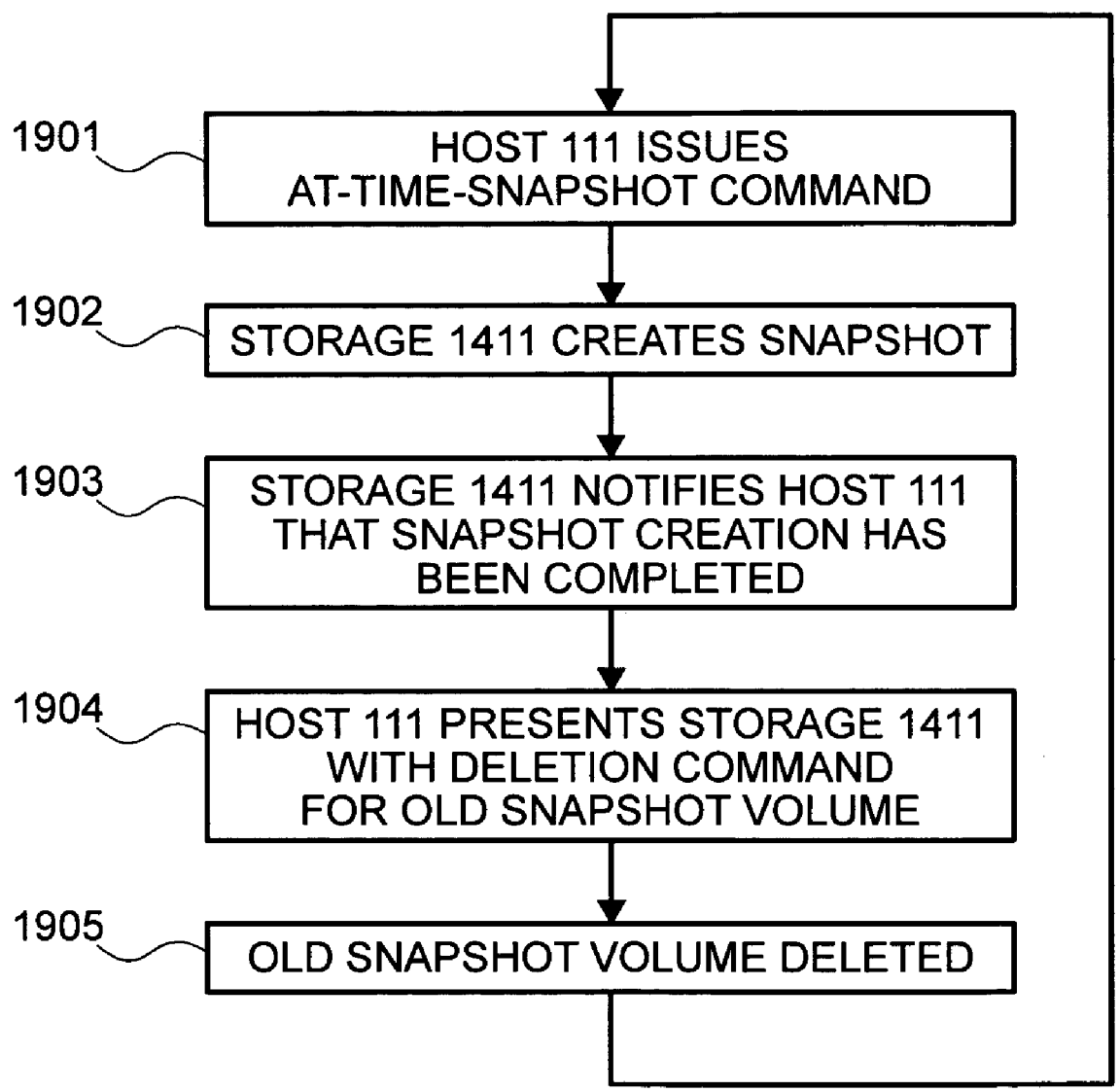
FIG. 19 is a flow diagram depicting an example of the operation whereby the snapshot is created during normal operation.

FIG. 19 is a flow diagram depicting an example of the operation whereby a snapshot is created during normal operation.

First, the command-issuing program 2202 of the host 111 specifies the same time and issues the At-Time-Snapshot command to the RC reflect program 302 of each of the plurality of storage systems 1411 via the RC data transfer program 204 of the storage systems 131 (step 1901). The At-Time-Snapshot command is a command for executing the snapshot function.

Figure 23:
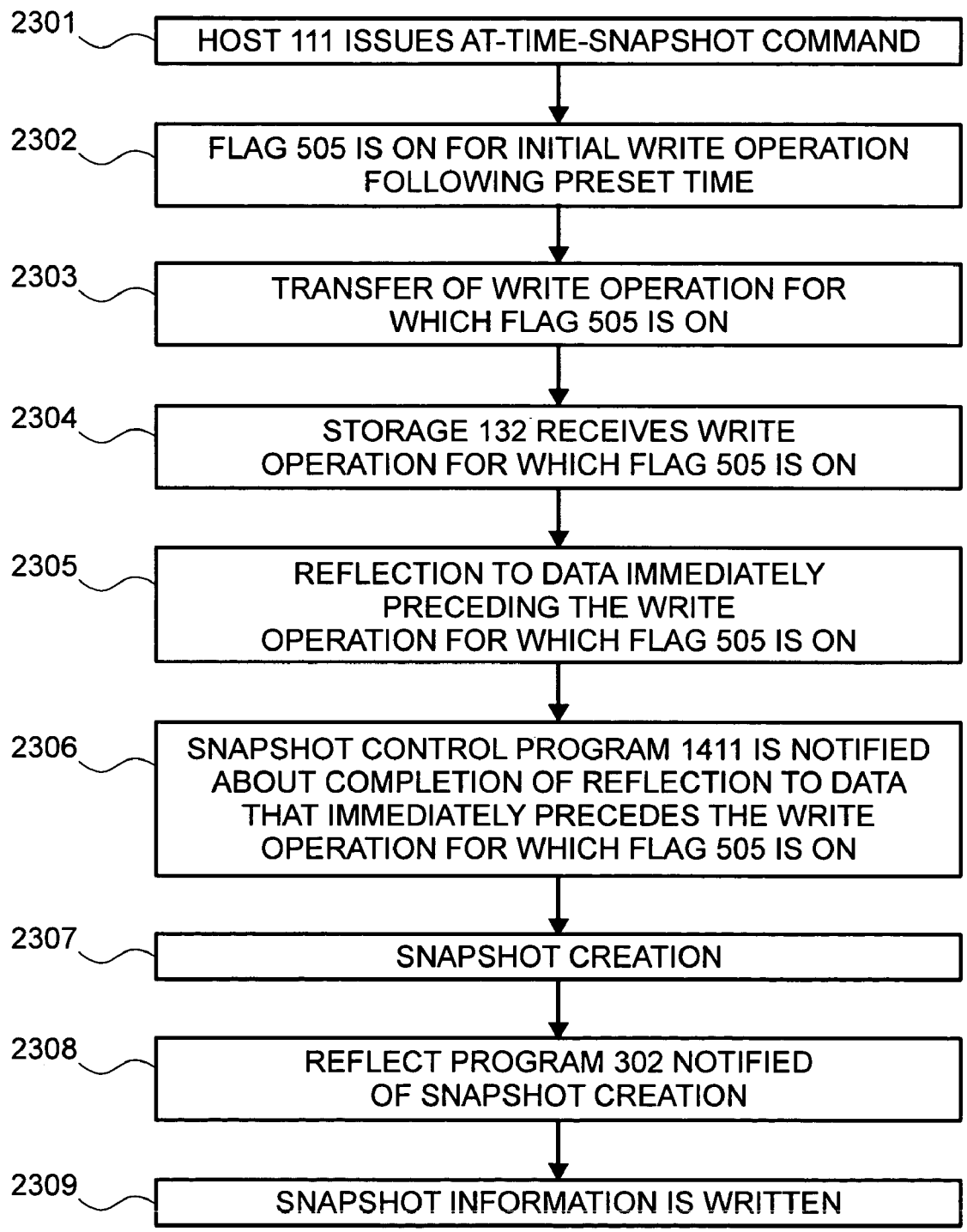
FIG. 23 is a flow diagram depicting an example of the At-Time-Snapshot operation of the snapshot function.

The snapshot control program 1801 of each of the plurality of storage systems 1411 then creates a snapshot volume according to the specified time of the At-Time-Snapshot command. Details thereof are shown in FIG. 23 (step 1902).

The snapshot control program 1801 of each of the plurality of storage systems 1411 then notifies the host 111 that snapshot creation is completed when the snapshot volume is created (step 1903).

When notification of completion of snapshot creation is received from all of the snapshot control programs 1801 of each of the plurality of storage systems 1411, the command-issuing program 2202 of the host 111 issues a command to delete the old snapshot volume to the snapshot control program 1801 of each of the plurality of storage systems 1411 via the RC data transfer program 204 of the storage systems 131. At this time, the host 111 issues an instruction so as to set the snapshot Flag 2002 of the snapshot volume created in step 1902 to ON and the snapshot Flag 2002 of the other snapshot volume to OFF in the storage systems 1411 (step 1904).

The snapshot control program 1801 of each of the plurality of storage systems 1411 then deletes the old snapshot volume, and the process returns to step 1901 (step 1905). Deletion of the old snapshot volume herein refers to the snapshot control program 1801 deleting the data stored in the saving volume 1402 that corresponds to the snapshot volume specified by the delete command, and deleting the snapshot No. 2001 of the old snapshot volume. After the old snapshot volume is deleted, the snapshot control program 1801 notifies the host of the deletion of the old snapshot volume. The host 111 that has received notification that deletion of the old snapshot volume is completed changes the setting in the host to the old snapshot volume. Also, the snapshot control program returns an error to the host if the snapshot control program 1801 has deleted the old snapshot volume, and the host has accessed the old snapshot volume. The host 111 may then change the setting in the host to the old snapshot volume.

FIG. 23 is a flow diagram depicting an example of the At-Time-Snapshot operation of the snapshot function.

First, the command-issuing program 2202 of the host 111 issues the At-Time-Snapshot command to the RC data transfer program 204 of each of the plurality of storage systems 131 (step 2301).

The RC data transfer program 204 of each of the plurality of storage systems 131 then sets the Flag 505 of the RC data information 212 to ON for the first write after the time specified by the At-Time-Snapshot command. Also, the RC reflect program 302 may set the Flag 505 to ON when it has received the data, instead of the RC data transfer program 204 (step 2302).

The RC data transfer program 204 of each of the plurality of storage systems 131 then transfers, to the storage systems 1411, the specified time of the At-Time-Snapshot command and the write data for which the Flag 505 is ON (step 2303).

The LR control program 303 of the storage systems 1411 then receives, from the storage systems 131, the write data for which the Flag 505 is ON and the specified time of the At-Time-Snapshot (step 2304).

With the RC reflect program 302 of each of the plurality of storage systems 1411, the data up to that immediately preceding the writing for which the Flag 505 is ON is then reflected to the volume 142 (step 2305).

The RC reflect program 302 of each of the plurality of storage systems 1411 then notifies each snapshot control program 1801 that reflection is completed up to the data immediately prior to writing for which the Flag 505 is ON (step 2306).

The snapshot control program 1801 then creates the snapshot volume 1401 (step 2307).

The snapshot control program 1801 of each of the plurality of storage systems 1411 then notifies each RC reflect program 302 of snapshot creation (step 2308).

The snapshot control program 1801 of each of the plurality of storage systems 1411 then writes the number of the snapshot created earlier in the snapshot information 1811 (step 2309). Step 2309 may be performed before step 2308.

When the snapshot volume is created and data is transferred from the storage systems 131 to the storage systems 1411, the data, which is stored in the memory area that holds the data transferred from the storage systems 131 to the storage systems 1411, is stored in the volume 1402. The data transferred from the storage systems 131 to the storage systems 1411 is then stored in the volume 142. However, this processing is executed only when the write operation is the first write operation to the memory area that occurs after the newest snapshot volume is created. Specifically, whether the writing is the first is managed by the bitmap in the storage systems 1411, and this processing is executed only in the case of the first write operation. The bitmap records the snapshot No. 2001, the address in the saving volume 1402 containing the saved data stored in the memory area of the volume 141 before the first write was executed, and the result of determining the address of the snapshot volume to which these data correspond. Also, whether the write operation is the first write may be administered by a method other than administration by a bitmap.

Figure 21:
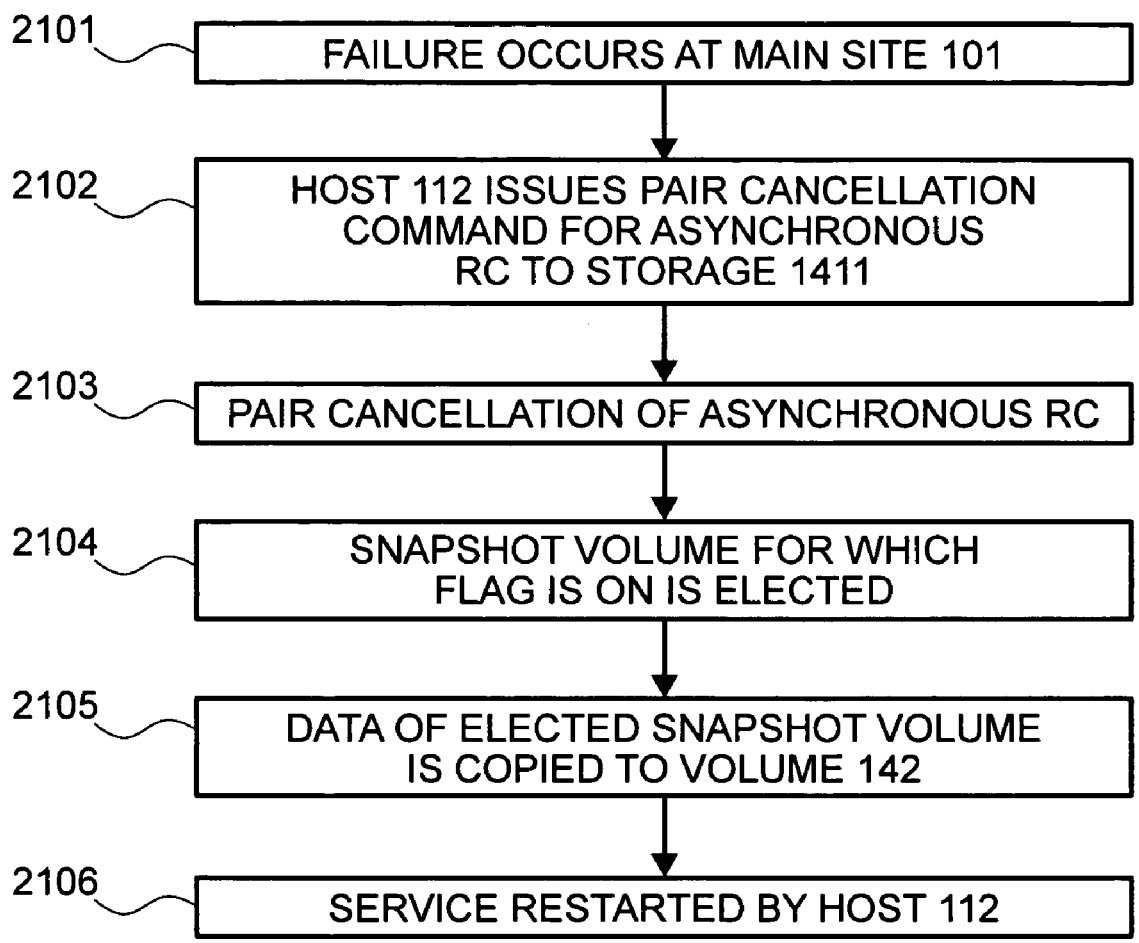
FIG. 21 is a diagram depicting an example of the processing whereby service is restarted at the sub-site after a failure occurs in the main site.

FIG. 21 is a flow diagram depicting an example of the processing which occurs until restarting of service by the host 112 after a failure occurs in the main site.

The host 112 of the sub-site issues notification that a failure has occurred in the main site. Also, notification of failure in the main site may be issued by the system administrator instead of by the host 112 (step 2101).

The command-issuing program 1602 of the host 112 then provides the RC pair operation program 202 of each of the plurality of storage systems 1411 with a command to cancel the asynchronous remote copy pair (step 2102).

The RC pair operation program 202 of each of the plurality of storage systems 1411 then cancels the asynchronous remote copy pair and sets the pair state to the Simplex state (step 2103).

The snapshot control program 1801 of each of the plurality of storage systems 1411 then elects the snapshot volume for which the snapshot Flag 2002 is ON (step 2104).

The snapshot control program 1801 of each of the plurality of storage systems 1411 then copies, to the volume 142, the data of the snapshot volume elected in step 2104. Specifically, the bitmap is referenced and the data stored in the volume 1402, that corresponds to the snapshot volume for which the snapshot Flag 2002 is ON is specified for copying to the volume 142. Also, in the present embodiment, the volume 1402 was shared by all of the snapshot volumes to which a snapshot number was attached, but a volume 1402 may also be prepared for each snapshot volume. In this case, the data stored in the volume 1402 that corresponds to the elected snapshot volume is copied to the volume 142 (step 2105).

The service is then restarted by the host 112 (step 2106).

Figure 22:
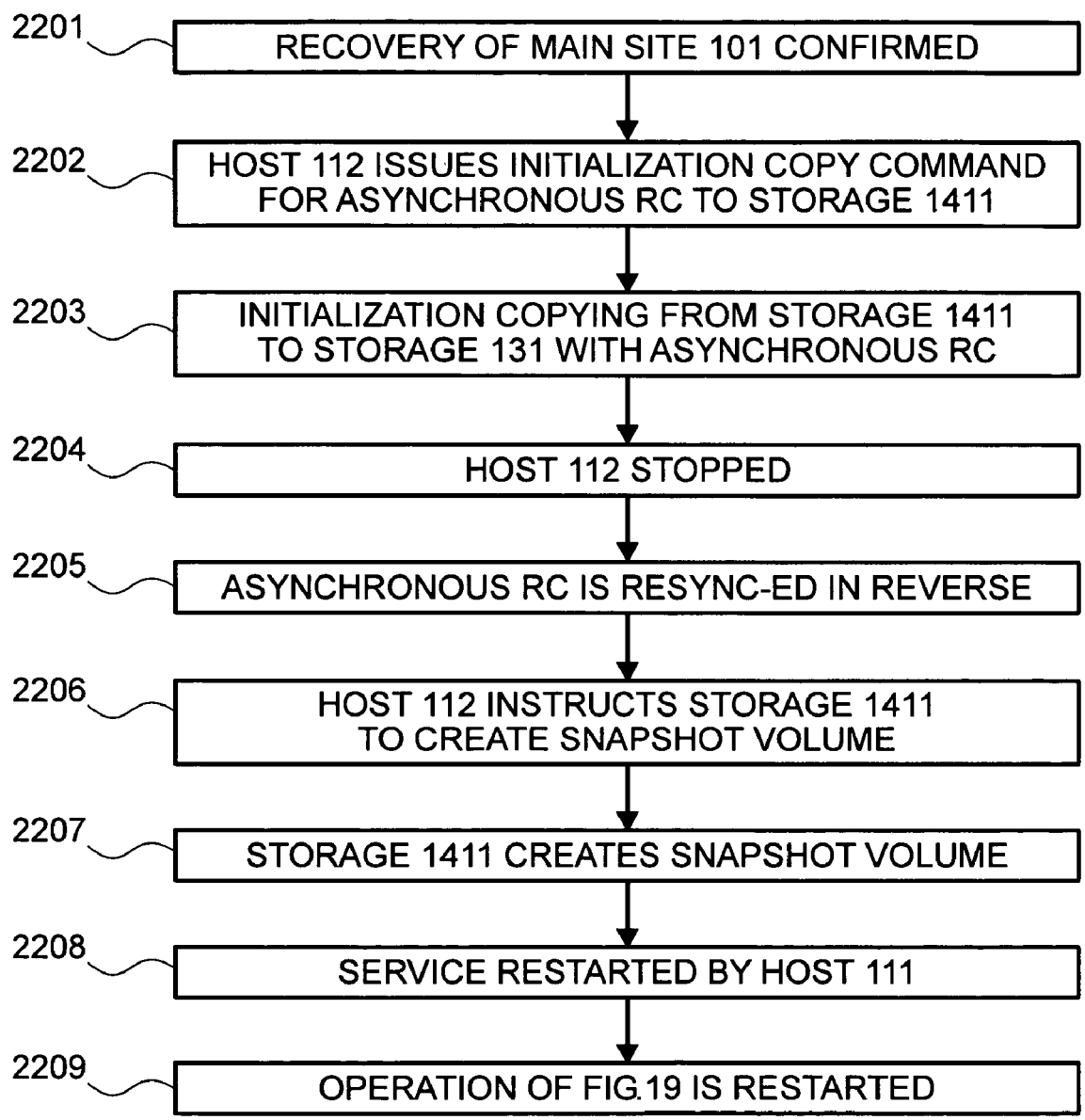
FIG. 22 is a flow diagram depicting an example of the processing whereby the main site is recovered and service is restarted at the main site after service is restarted at the sub-site.

FIG. 22 is a flow diagram depicting an example of the processing which occurs until the main site 101 is recovered and service is restarted by the host 111 after service is restarted at the sub-site 102.

First, the administrator confirms recovery of the main site 101 (step 2201).

The command-issuing program 2202 of the host 112 then issues an initialization copy command for asynchronous remote copying to each of the plurality of storage systems 132 according to an instruction of the administrator from an administration terminal connected to the information processing system (step 2202).

Each of the plurality of storage systems 1411 then performs initialization copying of asynchronous remote copying to the storage systems 131 (step 2203).

When the administrator finishes confirming, from the administration terminal, that the processing of step 1003 is completed, an instruction is issued to suspend the service of the host 112 (step 2204).

According to the command of the administrator from the administration terminal, the RC pair operation program 202 of each of the plurality of storage systems 132 then changes the asynchronous remote copying from the storage systems 1411 to the storage systems 131 to asynchronous remote copying from the storage systems 131 to the storage systems 1411 (step 2205).

The command-issuing program 1602 of the host 112 then issues a command instructing snapshot creation to each of the plurality of storage systems 1411 (step 2206).

The plurality of storage systems 1411 then create a snapshot (step 2207).

The administrator then restarts service in the host 111 (step 2208).

The normal operation shown in FIG. 19 is then restarted (step 2209).

In the present embodiment, only the difference in the data between the volume 142 and the snapshot volume 1401 is saved in the volume 1402, and so it becomes possible to reduce the volume capacity and the amount of data transferred in comparison to a case in which the local replication function is used.

What is claimed is:

1. An information processing system comprising:
a first site that is connected to a first computer and has a first storage system and a second storage system; and
a second site having a third storage system connected to a second computer and to the first storage system, and a fourth storage system connected to the second computer and to the second storage system; wherein
the third storage system has a first memory area for storing data transferred from the first storage system, and a second memory area and third memory area for storing a copy of the data stored in the first memory area of the third storage system;
the fourth storage system has a first memory area for storing data transferred from the first storage system, and a second memory area and third memory area for storing a copy of the data stored in the first memory area of the fourth storage system;
the first storage system and the second storage system each receive data with an attached writing time from the first computer;
the first storage system transfers to the third storage system the data received from the first computer and a copy of the writing time;
the second storage system transfers to the fourth storage system the data received from the first computer and a copy of the writing time;
the third storage system writes to the first memory area in the third storage system the data received from the first storage system in the time sequence in which the data were attached, and writes to the second memory area in the third storage system a copy of the data written in the first memory area in the third storage system in the time sequence in which the data were attached;

the fourth storage system writes to the first memory area in the fourth storage system the data received from the second storage system in the time sequence in which the data were attached, and writes to the second memory area in the fourth storage system a copy of the data written in the first memory area in the fourth storage system in the time sequence in which the data were attached;

when copying is completed to the second memory area in the third storage system of the data with an attached writing time that is prior to a first prescribed time specified by the first computer, the third storage system suspends writing to the second memory area in the third storage system of a copy of the data written in the first memory area in the third storage system;

the third storage system then initiates writing of a copy of the data written in the first memory area in the third storage system to the third memory area in the third storage system;

when copying is completed to the second memory area in the fourth storage system of the data with an attached writing time that is prior to a first prescribed time specified by the first computer, the fourth storage system suspends writing to the second memory area in the fourth storage system of a copy of the data written in the first memory area in the fourth storage system; and the fourth storage system then initiates writing of a copy of the data written in the first memory area in the fourth storage system to the third memory area in the fourth storage system.

2. The information processing system according to claim 1, wherein:

when copying is completed to the first memory area in the third storage system of the data with an attached writing time that is prior to a second prescribed time specified by the first computer, the third storage system suspends writing to the third memory area in the third storage system;

the third storage system then copies to the second memory area in the third storage system the data stored in the first memory area in the third storage system;

when copying is completed to the first memory area in the fourth storage system of the data with an attached writing time that is prior to a second prescribed time specified by the first computer, the fourth storage system suspends writing to the third memory area in the fourth storage system; and the fourth storage system then copies to the second memory area in the fourth storage system the data stored in the first memory area in the fourth storage system.

3. The information processing system according to claim 2, wherein:

when a failure occurs in the first site, the third storage system elects the memory area in which there was a suspension of writing of a copy of the data stored in the first memory area in the third storage system among the second memory area and third memory area in the third storage system when the failure occurred, and copies the data stored in the elected memory area to the first memory area; and the fourth storage system elects the memory area in which there was a suspension of writing of a copy of the data stored in the first memory area in the fourth storage system among the second memory area and third memory area in the fourth storage system when the failure occurred, and copies the data stored in the elected memory area to the first memory area.

4. The information processing system according to claim 3, wherein:

when the first site has recovered, the third storage system transfers a copy of the data stored in the first memory area in the third storage system to the first storage system; and the fourth storage system transfers a copy of the data stored in the first memory area in the fourth storage system to the first storage system.

5. A copy method for an information processing system that comprises:

a first site that is connected to a first computer and has a first storage system and a second storage system; and a second site having a third storage system that is connected to a second computer and to the first storage system and that comprises a first memory area for storing data transferred from the first storage system, and a second memory area and third memory area for storing a copy of the data stored in the first memory area of the third storage system; and a fourth storage system that is connected to the second computer and to the second storage system and that comprises a first memory area for storing data transferred from the first storage system, and a second memory area and third memory area for storing a copy of the data stored in the first memory area of the fourth storage system; said copy method for an information processing system comprising:

a step in which the first storage system and the second storage system each receive data with an attached writing time from the first computer;

a step in which the data received from the first computer and a copy of the writing time are transferred from the first storage system to the third storage system;

a step in which the data received from the first computer and a copy of the writing time are transferred from the second storage system to the fourth storage system;

a step in which the data received from the first storage system are written to the first memory area in the third storage system in the time sequence in which the data were attached, and a copy of the data written in the first memory area in the third storage system is written to the second memory area in the third storage system in the time sequence in which the data were attached;

a step in which the data received from the second storage system are written to the first memory area in the fourth storage system in the time sequence in which the data were attached, and a copy of the data written in the first memory area in the fourth storage system is written to the second memory area in the fourth storage system in the time sequence in which the data were attached;

a step in which writing to the second memory area in the third storage system of a copy of the data written in the first memory area in the third storage system is suspended when copying is completed to the second memory area in the third storage system of the data with an attached writing time that is prior to a first prescribed time specified by the first computer;

a step in which writing of a copy of the data written in the first memory area in the third storage system to the third memory area in the third storage system is then initiated;

a step in which writing to the second memory area in the fourth storage system of a copy of the data written in the first memory area in the fourth storage system is suspended when copying is completed to the second memory area in the fourth storage system of the data with an attached writing time that is prior to a first prescribed time specified by the first computer; and a step in which writing of a copy of the data written in the first memory area in the fourth storage system to the third memory area in the fourth storage system is then initiated.

6. The copy method for an information processing system according to claim 5, comprising:

a step in which writing to the third memory area in the third storage system is suspended when copying is completed to the first memory area in the third storage system of the data with an attached writing time that is prior to a second prescribed time specified by the first computer;

a step in which the data stored in the first memory area in the third storage system are copied to the second memory area in the third storage system;

a step in which writing to the third memory area in the fourth storage system is suspended when copying is completed to the first memory area in the fourth storage system of the data with an attached writing time that is prior to a second prescribed time specified by the first computer; and a step in which the data stored in the first memory area in the fourth storage system are copied to the second memory area in the fourth storage system.

7. The copy method for an information processing system according to claim 6, comprising:

a step in which a failure in the first site causes the memory area in which there was a suspension of writing of a copy of the data stored in the first memory area in the third storage system to be elected among the second memory area and third memory area in the third storage system when the failure occurs;

a step in which the data stored in the elected memory area are copied to the first memory area in the third storage system;

a step in which the memory area in which there was a suspension of writing of a copy of the data stored in the first memory area in the fourth storage system is elected among the second memory area and third memory area in the fourth storage system when a failure occurs; and a step in which the data stored in the elected memory area are copied to the first memory area in the fourth storage system.

8. The copy method for an information processing system according to claim 7, comprising:

a step in which a copy of the data stored in the first memory area in the third storage system is transferred to the first storage system when the first site has recovered; and a step in which a copy of the data stored in the first memory area in the fourth storage system is transferred to the second storage system.

9. An information processing system, comprising a first site that is connected to a first computer and has a first storage system and a second storage system; and a second site having a third storage system connected to a second computer and to the first storage system, and a fourth storage system connected to the second computer and to the second storage system; wherein the third storage system has a first memory area for storing data transferred from the first storage system, and a second memory area which is an evacuation destination of the data stored in the first memory area of the third storage system;

the fourth storage system has a first memory area for storing data transferred from the second storage system, and a second memory area which is an evacuation destination of the data stored in the first memory area of the fourth storage system;

the first storage system and the second storage system each receive data with an attached writing time from the first computer;

the first storage system transfers to the third storage system the data received from the first computer and a copy of the writing time;

the second storage system transfers to the fourth storage system the data received from the first computer and a copy of the writing time;

the third storage system receives data with an attached writing time that is subsequent to the first prescribed time specified by the first computer, whereupon if the data stored in the first memory area of the third storage system in which data are written with a writing time attached thereto that is subsequent to the first prescribed time are data that precede the first prescribed time, the data are copied to the second memory area of the third storage system, and data to which a writing time was attached that is subsequent to the first prescribed time are stored in the first memory area in the third storage system;

the data stored in the second memory area in the third storage system are deleted when data are received to which a writing time is attached that is subsequent to the second prescribed time specified by the first computer;

the fourth storage system receives data with an attached writing time that is subsequent to the first prescribed time, whereupon if the data stored in the first memory area of the fourth storage system in which data are written with a writing time attached thereto that is subsequent to the first prescribed time are data that precede the first prescribed time, the data are copied to the second memory area of the fourth storage system, and data to which a writing time was attached that is subsequent to the first prescribed time are stored in the first memory area in the fourth storage system; and the data with an attached writing time that is prior to a first prescribed time stored in the second memory area in the fourth storage system are deleted when data are received to which a writing time is attached that is subsequent to the second prescribed time.

10. The information processing system according to claim 9, wherein the third storage system stores in the first memory area of the third storage system the data with an attached writing time that is subsequent to the second prescribed time after copying the data to the second memory area of the third storage system if the data stored in the first memory area of the third storage system containing written data with an attached writing time that is subsequent to the second prescribed time are data that precede the second prescribed time; and the fourth storage system stores in the first memory area of the fourth storage system the data with an attached writing time that is subsequent to the second prescribed time after copying the data to the second memory area of the fourth storage system if the data stored in the first memory area of the fourth storage system containing written data with an attached writing time that is subsequent to the second prescribed time are data that precede the second prescribed time.

11. The information processing system according to claim 9, wherein:

when a failure occurs in the first site, the third storage system copies data having a writing time that precedes the second prescribed time from the second memory area to the first memory area in the third storage system; and the fourth storage system copies data having a writing time that precedes the second prescribed time from the second memory area to the first memory area in the fourth storage system.

12. The information processing system according to claim 11, wherein when the first site has recovered, the third storage system transfers a copy of the data stored in the first memory area in the third storage system to the first storage system; and the fourth storage system transfers a copy of the data stored in the first memory area in the fourth storage system to the first storage system.

* * * * *

UNITED STATES PATENT AND TRADEMARK OFFICE
CERTIFICATE OF CORRECTION

PATENT NO. : 7,200,725 B2
APPLICATION NO. : 10/950577
DATED : April 3, 2007
INVENTOR(S) : T. Maruyama et al.

It is certified that error appears in the above-identified patent and that said Letters Patent is hereby corrected as shown below:

On the Title page, under the heading Item [56] "Foreign Application Priority Data", add:

--Sept. 17, 2004 (JP) - - - - - - - 2004-270672--

Signed and Sealed this

Twenty-second Day of May, 2007

JON W. DUDAS
*Director of the United States Patent and Trademark Office*